US011809759B2

(12) United States Patent
Imamura

(10) Patent No.: US 11,809,759 B2
(45) Date of Patent: Nov. 7, 2023

(54) IMAGE PROCESSING DEVICE AND CONTROL METHOD OF IMAGE PROCESSING DEVICE FOR DISPLAYING INDEX RELATED TO CONSUMABLE MATERIALS

(71) Applicant: SEIKO EPSON CORPORATION, Tokyo (JP)

(72) Inventor: Yui Imamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/664,234

(22) Filed: May 20, 2022

(65) Prior Publication Data
US 2022/0374176 A1 Nov. 24, 2022

(30) Foreign Application Priority Data
May 20, 2021 (JP) ................................. 2021-085143

(51) Int. Cl.
*G06F 3/12* (2006.01)
(52) U.S. Cl.
CPC .......... *G06F 3/1208* (2013.01); *G06F 3/1229* (2013.01); *G06F 3/1253* (2013.01)
(58) Field of Classification Search
None
See application file for complete search history.

(56) References Cited

U.S. PATENT DOCUMENTS

| 8,520,227 | B2* | 8/2013 | Toizumi | H04N 1/00236 |
| | | | | 399/53 |
| 9,898,238 | B2* | 2/2018 | Eom | G06F 3/1253 |
| 2008/0037058 | A1* | 2/2008 | Ban | H04N 1/00482 |
| | | | | 358/1.15 |
| 2011/0116108 | A1* | 5/2011 | Ha | G06F 3/1253 |
| | | | | 715/833 |
| 2011/0279858 | A1* | 11/2011 | Kano | G06F 3/1285 |
| | | | | 358/1.15 |
| 2014/0078522 | A1* | 3/2014 | Hiraki | G06Q 20/085 |
| | | | | 358/1.2 |
| 2016/0277634 | A1* | 9/2016 | Hiraki | H04N 1/393 |
| 2019/0079708 | A1* | 3/2019 | Yamada | G06F 3/1263 |
| 2020/0356331 | A1* | 11/2020 | Yoshioka | G06F 3/1204 |
| 2021/0334048 | A1* | 10/2021 | Matsuzawa | G06F 3/1253 |

FOREIGN PATENT DOCUMENTS

| JP | 2011-186691 | 9/2011 |
| JP | 2013-129160 A | 7/2013 |

* cited by examiner

*Primary Examiner* — Henok Shiferaw
(74) *Attorney, Agent, or Firm* — WORKMAN NYDEGGER

(57) ABSTRACT

An image processing device includes a display, an input section, a print section that executes printing by using a consumption material, and a controller, in which the controller calculates an index value of an index relating to the consumption material consumed by the print section to display the index and the index value by the display, displays a setting item relating to the index by the display, when input indicating that the index is selected is detected by the input section, and controls the print section to execute printing based on setting of the setting item, when input indicating that the setting item is set is detected by the input section.

8 Claims, 10 Drawing Sheets

IMAGE PROCESSING DEVICE AND CONTROL METHOD OF IMAGE PROCESSING DEVICE FOR DISPLAYING INDEX RELATED TO CONSUMABLE MATERIALS

The present application is based on, and claims priority from JP Application Serial Number 2021-085143, filed May 20, 2021, the disclosure of which is hereby incorporated by reference herein in its entirety.

BACKGROUND

1. Technical Field

The present disclosure relates to an image processing device and a control method of an image processing device.

2. Related Art

In the related art, as shown in JP-A-2013-129160, a device that displays an index for reducing paper on a screen is known.

The device described above displays the index on the screen, but cannot provide means of making settings in association with the displayed index.

SUMMARY

According to an aspect of the present disclosure, an image processing device includes a display section, an input section, a print section that executes printing by using a consumption material, and a control section, in which the control section calculates an index value of an index relating to the consumption material consumed by the print section to display the index and the index value by the display section, displays a setting item relating to the index by the display section, when input indicating that the index is selected is detected by the input section, and controls the print section to execute printing based on setting of the setting item, when input indicating that the setting item is set is detected by the input section.

According to another aspect of the present disclosure, a control method of an image processing device including a display section, an input section, and a print section that executes printing by using a consumption material, includes calculating an index value of an index relating to the consumption material used by the print section to display the index and the index value by the display section, displaying a setting item relating to the index by the display section, when input indicating that the index is selected is detected by the input section, and controlling the print section to execute printing based on setting of the setting item, when input indicating that the setting item is set is detected by the input section.

DESCRIPTION OF EXEMPLARY EMBODIMENTS

1. First Embodiment 1-1. Configuration of Image Processing Device

Figure 1:
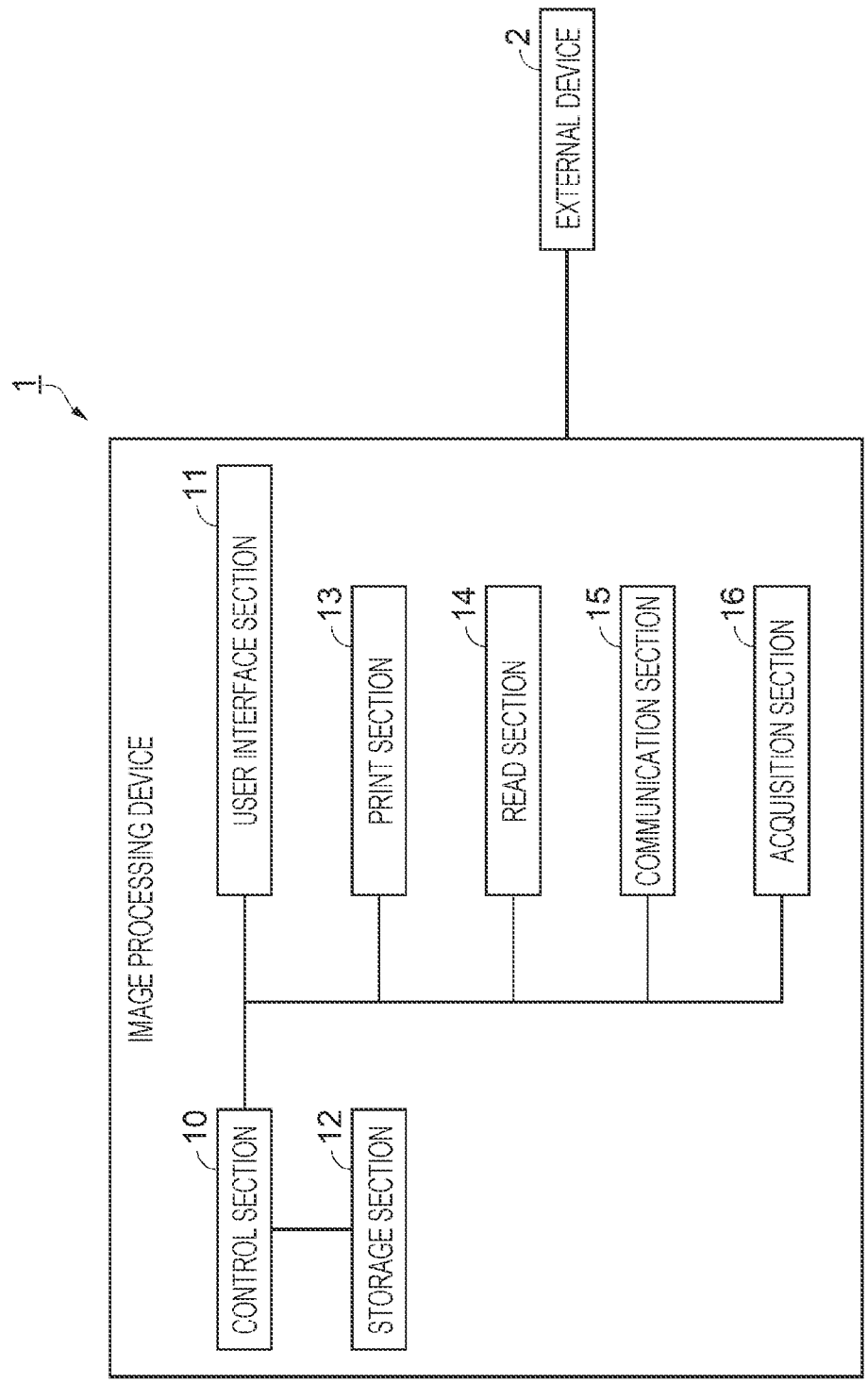
FIG. 1 is a block diagram showing a configuration of an image processing device.

As shown in FIG. 1, an image processing device 1 according to an embodiment has a control section 10, a user interface section (hereinafter referred to as a UI section) 11, a storage section 12, a print section 13, a read section 14, a communication section 15, and an acquisition section 16. Each component will be described in detail.

The control section 10 comprehensively controls each section of the image processing device 1. The control section 10 includes a central processing unit (CPU), for example. The CPU is also called a processor.

The storage section 12 includes a flash read only memory (ROM), which is a rewritable non-volatile memory, and a random access memory (RAM), which is a volatile memory.

The control section 10 reads out a program, such as firmware, stored in the flash ROM of the storage section 12 and executes the program using the RAM of the storage section 12 as a work area.

In addition, the storage section 12 stores a setting item relating to the control of the print section 13 and setting information corresponding to the setting item. The control section 10 reads out the setting information from the storage section 12, controls the print section 13 to execute printing.

The UI section 11 is a touch panel display, for example. The UI section 11 includes a display panel, which is a display section that displays various information, and a detection panel, which is an input section.

The detection panel is configured to be superimposed on the display panel. The detection panel detects an operation of a human finger by a method, such as a capacitance method, a resistance film method, or an optical method. It should be noted that the input section may be configured as a key, and a number or the like of the setting information can be input.

The print section 13 has a transport mechanism that transports paper, which is a sheet of paper, from a paper feed tray, an ink jet head that executes printing by adhering ink to the transported paper, and a cartridge that stores the ink.

It should be noted that the transport mechanism also includes a mechanism that reverses the paper. The print section 13 can execute printing on both sides of the paper by executing printing on one side of the paper with the head, inverting the paper by the transport mechanism, and then executing printing on the other side of the paper with the head.

The print section 13 executes printing by using the paper or the ink, which is a consumption material. Examples of the paper include plain paper, recycled paper, photo paper, and synthetic paper containing resin.

The ink has four colors (black, yellow, magenta, and cyan), for example. The control section 10 can control the head of the print section 13 to execute full-color printing in which printing can be executed by using four-color ink, two-color printing in which printing is executed by combining any two-color ink, and monochrome printing in which printing is executed by using the ink of black. It should be noted that, in a case in which two-color printing and monochrome printing are executed, as compared with full-color printing, an ejection amount of ink to the paper is small, so that a consumption amount of ink can be suppressed.

The control section 10 can store an index relating to the paper or the ink consumed by the print section 13 and an index value corresponding to the index in the storage section 12, and can display the index and the index value on the display panel of the UI section 11.

The read section 14 includes a document transport mechanism that transports a document mounted on a document stand, and a color image sensor that receives reflected light of the transported document and reads the reflected light as scan data decomposed into each color of red, green, and blue (RGB). The scan data is second information. It should be noted that the document transport mechanism also includes a mechanism that reverses the document, and the color image sensor can read both sides of the document.

A function of reading the document by the read section 14 and acquiring the scan data under the control of the control section 10 is referred to as a scan function.

In addition, a function by a second print format in which the document is read by the read section 14 to acquire the scan data and the color of the ink is converted to execute printing by the print section 13 under the control of the control section 10 is referred to as a copy function.

The communication section 15 includes a circuit capable of communicating with an external device 2, such as a computer, wirelessly or by wire. The communication section 15 receives a print job, which is first information, from the external device 2. In addition, the communication section 15 transmits predetermined information, such as error information in a case in which an error occurs and warning information to the external device 2.

A function in a first print format in which the print job received by the communication section 15 is printed by the print section 13 under the control of the control section 10 is referred to as a print function.

The image processing device 1 includes a card reader, which is the acquisition section 16 capable of acquiring identification information from an ID card having the identification information. The card reader includes an optical sensor carried on the ID card to read a barcode including identification information, or a communication circuit capable of performing contact or non-contact communication with an IC, which is built in the ID card and stores the identification information. The control section 10 can acquire the identification information of the ID card by the card reader.

1-2. Setting Screen 1

As an example of a setting screen, a setting screen 1 shown in FIG. 2 will be described. The control section 10 displays a "basic setting screen" 100 shown in FIG. 2 by the display panel of the UI section 11 in an initial state in which the power is turned on, in a standby state in which the reception of the print job from the external device 2 is waited for, or in a standby state in which an instruction of copy or scan by a user is waited for.

On the "basic setting screen" 100, "print" 101, "copy" 102, and "scan" 103, which are buttons for selecting the print function, the copy function, and the scan function described above are displayed.

The user selects a button of any of the functions of the "print" 101, the "copy" 102, and the "scan" 103, and touches the button with a finger. The control section 10 can detect the touched button by the detection panel of the UI section 11. It should be noted that selection or setting of the function or the setting item is made and touching the function or the setting item with a finger is made by selecting the button displayed on the display panel of the UI section 11 by the user is referred to as input indicating that the selection or setting is made.

When the input indicating that the button of the "print" 101 is selected is detected by the detection panel of the UI section 11, the control section 10 prints, by the print section 13, the print job received from the external device 2 by the communication section 15.

As will be described below, when the print section 13 prints the print job, the control section 10 reads out a double-sided printing setting, a multipage printing setting, and a print color setting, which are the setting items stored in the storage section 12, and controls the print section 13.

In addition, the print job includes the identification information which is unique information of the user or the external device 2. The control section 10 can acquire the identification information included in the print job received by the communication section 15.

When the input indicating that the button of the "copy" 102 is selected is detected by the detection panel of the UI section 11, the control section 10 reads the document by the read section 14, acquires the scan data, and executes printing by the print section 13.

As will be described below, when the print section 13 prints the scan data, the control section 10 reads out the double-sided printing setting, the multipage printing setting, and the print color setting, which are the setting items stored in the storage section 12, and controls the print section 13.

When the identification information is acquired by the card reader, the control section 10 can permit the copy function, can control the read section 14 and the print section 13, and can execute copy in which the scan data is acquired and printed.

When the input indicating that the button of the "scan" 103 is selected is detected by the detection panel of the UI section 11, the control section 10 reads the document by the read section 14, acquires the scan data, and stores the scan data in the storage section 12. The control section 10 reads out the scan data from the storage section 12 and transmits the read out scan data to the external device 2 by the communication section 15.

When the identification information is acquired by the card reader, the control section 10 can permit the scan function, can control the read section 14, and can execute the scan.

The control section 10 can calculate the index value of the index relating to the paper or the ink consumed by the print section 13 and can display the calculated index value by the display panel of the UI section 11.

Figure 2:
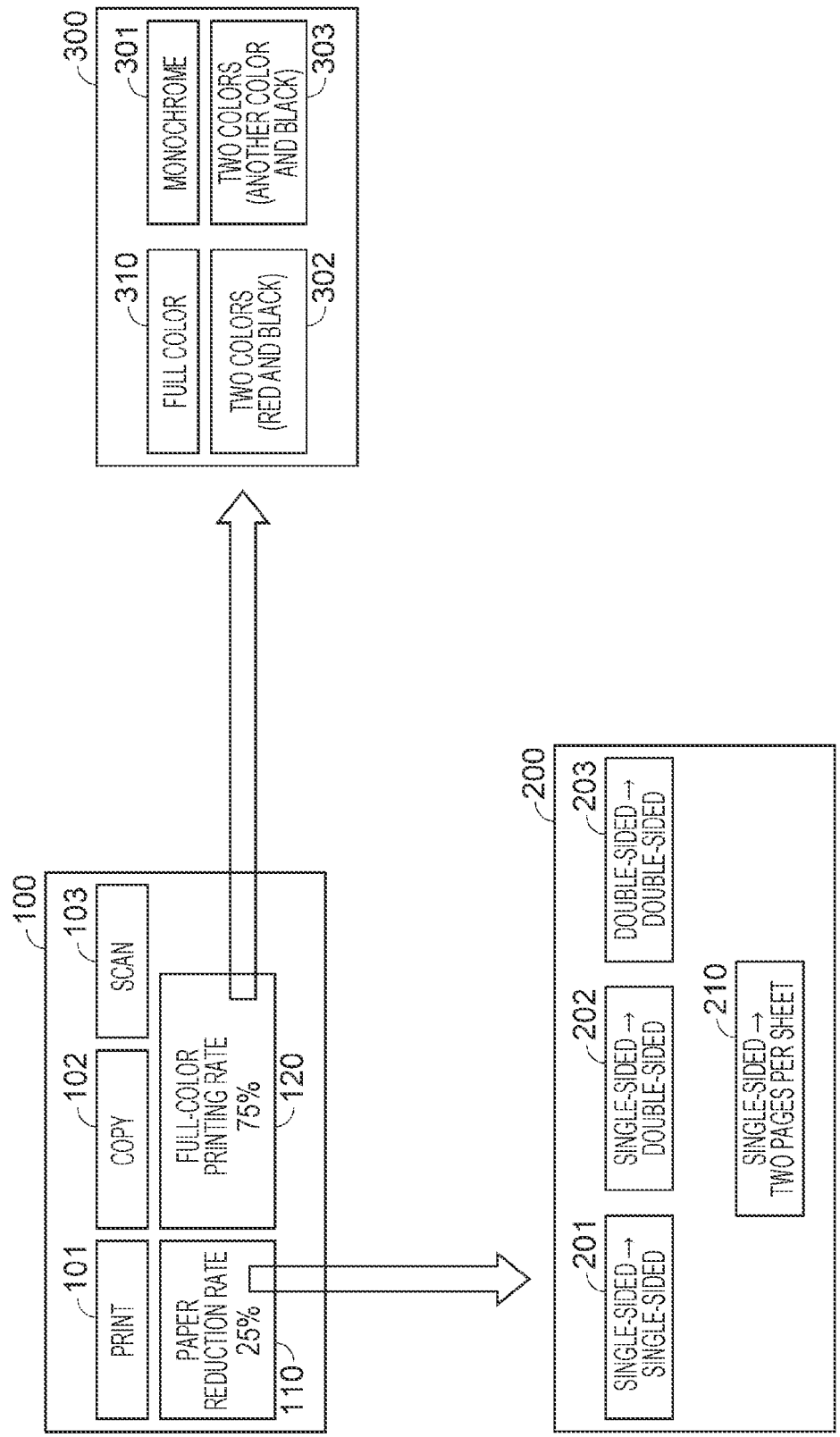
FIG. 2 is a transition diagram from a "basic setting screen" to a "paper reduction setting screen" or a "print color setting screen".

As shown in the "basic setting screen" 100 of FIG. 2, the UI section 11 displays a "paper reduction rate" 110, which is the button indicating the index, and 25%, which is the calculated index value, as an example a case in which the index relates to the consumed paper. In addition, the UI section 11 displays a "full-color printing rate" 120, which is the button indicating the index, and 95%, which is the calculated index value, as an example a case in which the index relates to the consumed ink.

When the user selects a button of the "paper reduction rate" 110, which is the index displayed on the display panel of the UI section 11, and touches the button with a finger, the detection panel of the UI section 11 detects the input indicating that the "paper reduction rate" 110 is selected.

When the input indicating that the "paper reduction rate" 110 is selected on the detection panel of the UI section 11 is detected, as shown in FIG. 2, the control section 10 transitions to a "paper reduction setting screen" 200 relating to the "paper reduction rate" 110 and displays the "paper reduction setting screen" 200 by the display panel of the UI section 11.

The user selects the button of any of the setting items displayed on the "paper reduction setting screen" 200 and a "print color setting screen" 300 described below on the display panel of the UI section 11 and touches the button with a finger. The detection panel of the UI section 11 detects the input indicating that the setting item of the touched button is set. When the detection panel of the UI section 11 detects the input indicating that the setting item is set, the control section 10 stores the set setting item in the storage section 12. Here, the storage of the setting item in the storage section 12 by the control section 10 is also included in the control in which the control section 10 sets the setting item.

The control section 10 can read out the set setting item from the storage section 12, can control the print section 13 based on the set setting item, and can print the print job or the scan data.

Examples of a paper reduction setting item included in the setting item include setting of a side of the paper to be printed by the control section 10 by using the print section 13. Specifically, as shown in the "paper reduction setting screen" 200 of FIG. 2, the UI section 11 displays, as the buttons indicating the paper reduction setting items, "single-sided→single-sided" 201, "single-sided→double-sided" 202, and "double-sided→double-sided" 203, and allows setting of the side of the paper to be printed.

Specifically, when the user selects the button of any of the paper reduction setting items and touches the button with a finger, the detection panel of the UI section 11 detects the input indicating that the setting item of the touched button is set. The control section 10 can store the detected setting item in the storage section 12 and can make double-sided printing setting, which is a paper reduction setting, which can be used for controlling the print section 13.

A case will be described in which the control section 10 prints, for example, the print job or the scan data for two pages. When "single-sided→single-sided" 201 is set, the control section 10 controls the print section 13 to print one page on one side of the paper, so that the consumption of the paper is two sheets. On the other hand, when "single-sided→double-sided" 202 is set, the control section 10 controls the print section 13 to print two pages using both sides of the paper, so that the consumption of the paper is one sheet. In addition, in a case in which the control section 10 prints the scan data for two pages obtained by reading the double-sided document, when "double-sided→double-sided" 203 is set, the control section 10 controls the print section 13 to print two pages using both sides of the paper, so that the consumption of the paper is one sheet.

As another example of the paper reduction setting item, the control section 10 makes a setting in which the print jobs or the scan data are reduced, are collected on the paper, and are printed. Specifically, as shown in the "paper reduction setting screen" 200 of FIG. 2, the UI section 11 displays "single-sided→two pages per sheet" 210, which is the button indicating the paper reduction setting item, and allows the setting of multipage printing. It should be noted that, in addition to two pages per sheet, any plurality of pages per sheet may be adopted, such as four pages per sheet.

Specifically, when the user selects the button of any of the paper reduction setting items and touches the button with a finger, the detection panel of the UI section 11 detects the input indicating that the setting item of the touched button is set. The control section 10 can store the detected setting item in the storage section 12 and can make multipage printing setting, which is a paper reduction setting, which can be used for controlling the print section 13.

A case will be described in which the control section 10 prints, for example, the print job or the scan data for four pages. When the "single-sided→two pages per sheet" 210 is set and the "double-sided→double-sided" 203 is set, the control section 10 reduces the print job or the scan data and controls the print section 13 to print two pages on one side, respectively, that is, four pages using both sides of the paper, so that the consumption of the paper is one sheet.

The control section 10 calculates a ratio of the consumption amount of paper in a case in which the print job or the scan data is printed on one side of the paper to the reduction amount of paper actually printed by the print section 13 based on setting of the paper reduction setting item, as the index value of the paper reduction rate, which is the index.

As described above, for example, in a case of the print job or the scan data for two pages, when the "single-sided→double-sided" 202 is set, the control section 10 controls the print section 13 to execute printing using both sides of the paper, so that the consumption of the paper is one sheet. In a case in which printing is executed on one side of the paper, the consumption of the paper is two sheets, so that the control section 10 calculates the index value of the paper reduction rate as 50%, which is calculated with 1 sheet/2 sheets.

In addition, as described above, for example, in a case of the print job or the scan data for four pages, when the "single-sided→two pages per sheet" 210 is set and the "single-sided→single-sided" 201 is set, the control section 10 controls the print section 13 to print two pages on each side of the paper, so that the consumption of the paper is two sheets. In a case in which printing is executed on one side of the paper, the consumption of the paper is four, so the number of sheets of paper reduced is two sheets. Therefore, the control section 10 calculates the index value of the paper reduction rate as 50%, which is calculated with 2 sheets/4 sheets.

In this case, in a case in which "single-sided→double-sided" 202 is set, the control section 10 controls the print section 13 to print two pages on each page using both sides of the paper, so that the consumption of the paper is one sheet. Since the number of sheets of paper reduced is three sheets, the control section 10 calculates the index value of the paper reduction rate as 75%, which is calculated with 3 sheets/4 sheets.

The control section 10 stores, in the storage section 12, the index value of the paper reduction rate calculated as described above in association with the paper reduction rate, which is the index, the set paper reduction setting item, the acquired identification information, the consumption amount of paper, the print function, which is the first print format, or the copy function, which is the second print format. The control section 10 reads out the index value of the paper reduction rate from the storage section 12 and displays the read out index value by the display panel of the UI section 11. In the example shown in the "basic setting screen" 100 of FIG. 2, the control section 10 calculates and displays 25% as the index value of the paper reduction rate, which is the index.

It should be noted that, as the print job or the scan data that is the target when the index value of the paper reduction rate is calculated, the control section 10 use a material immediately previously printed by the print section 13, may use the accumulation of a plurality of the print job or the scan data printed within a predetermined period or within a predetermined range, or may use a material data selected by the UI section 11 by the user.

In addition, the control section 10 may read out the index value of the paper reduction rate relating to each identification information from the storage section 12 and may calculate the read out index value. The control section 10 can display, by the display panel of the UI section 11, each of the index of the paper reduction rate relating to each identification information, the calculated index value of the paper reduction rate, the set paper reduction setting item, the consumption amount of paper, the print function, which is the first print format, or the copy function, which is the second print format, together with the identification information.

The control section 10 can display the index value of the paper reduction rate calculated for each identification information by the UI section 11 and can store the paper reduction setting item for each identification information set by the user in the storage section 12. The control section 10 can read out the paper reduction setting item corresponding to the identification information included in the received print job from the storage section 12, and can control the print section 13 to execute printing.

In addition, the storage section 12 stores a threshold value of the paper reduction rate. The control section 10 compares the index value of the paper reduction rate calculated for each identification information with the threshold value of the paper reduction rate read out from the storage section 12. The control section 10 specifies the identification information of which the paper reduction rate is lower than the threshold value of the paper reduction rate, that is, which tends not to reduce the paper.

The control section 10 transmits the warning information indicating that the paper reduction rate is lower than the threshold value by the communication section 15 to the external device 2 that transmits the print job including the specified identification information. The control section 10 also displays the warning information on the UI section 11. The control section 10 may not permit the print function to the external device 2 that transmits the print job including the specified identification information, and may not execute printing.

When the specified identification information is acquired by the card reader, the control section 10 does not permit the copy function and does not execute the copy. The control section 10 displays the warning information indicating that the paper reduction rate is lower than the threshold value on the UI section 11.

When the user selects a button of the "full-color printing rate" 120, which is the index displayed on the display panel of the UI section 11, and touches the button with a finger, the detection panel of the UI section 11 detects the input indicating that the "full-color printing rate" 120 is selected.

When the input indicating that the "full-color printing rate" 120 is selected on the detection panel of the UI section 11 is detected, as shown in FIG. 2, the control section 10 transitions to a "print color setting screen" 300 relating to the "full-color printing rate" 120 and displays the "print color setting screen" 300 by the display panel of the UI section 11.

Examples of the print color setting item included in the setting item include setting of the print color when the control section 10 executes printing on paper. Specifically, as shown in the "print color setting screen" 300 of FIG. 2, the UI section 11 displays, as buttons indicating the print color setting items, "full color" 310, "monochrome" 301, "two colors (red and black)" 302, and "two colors (another color and black)" 303, and allows the setting of these print colors. It should be noted that the control section 10 may allow the setting of any one color and any three print colors.

Specifically, when the user selects the button of any of the print color setting items and touches the button with a finger, the detection panel of the UI section 11 detects the input indicating that the setting item of the touched button is set. The control section 10 can store the detected setting item in the storage section 12 and can make the print color setting, which can be used for controlling the print section 13.

For example, in a case of a four-color full-color print job or scan data, when the "full color" 310 is set, the control section 10 controls the print section 13 to execute printing by using the four-color ink. When the "monochrome" 301 is set, the control section 10 performs color conversion for the four-color full-color print job or scan data, and controls the print section 13 to execute printing by using the ink of black. When the "two colors (red and black)" 302 is set, the control section 10 performs the color conversion and controls the print section 13 to execute printing by using the inks of magenta and black. When the "two colors (another color and black)" 303 is set, the control section 10 performs the color conversion and controls the print section 13 to execute printing by using the inks of yellow or cyan other than magenta, and black.

The control section 10 calculates, for the print job or the scan data, a ratio of the number of pages in a case in which all pages are printed in full color to the number of pages in a case in which printing is executed in full color by actually using four-color ink by the print section 13 based on the print color set by the print color setting item, as the index value of the full-color printing rate.

For example, for the print job or the scan data for one page, when printing is actually executed by the print section 13 based on any setting of the "monochrome" 301, the "two colors (red and black)" 302, and the "two colors (another color and black)" 303, the number of pages printed in full color is zero page, so that the control section 10 calculates the index value of the full-color printing rate as 0%. On the other hand, for the print job or the scan data for one page, when printing is actually executed by the print section 13 based on the setting of the "full color" 310, the number of pages printed in full color is one page, so that the control section 10 calculates the index value of the full-color printing rate as 100%, which is calculated with 1 page/1 page.

The control section 10 stores, in the storage section 12, the index value of the full-color printing rate calculated as described above in association with the full-color printing rate, which is the index, the set print color setting item, the acquired identification information, the consumption amount of ink, the print function, which is the first print format, or the copy function, which is the second print format. The control section 10 reads out the index value of the full-color printing rate from the storage section 12 and displays the read out index value by the display panel of the UI section 11 as the index value. In the example shown in the "basic setting screen" 100 of FIG. 2, the control section 10 calculates and displays 75% as the index value of the full-color printing rate, which is the index.

It should be noted that, as the print job or the scan data that is the target when the index value of the full-color printing rate is calculated, the control section 10 use a material immediately previously printed by the print section 13, may use the accumulation of a plurality of the print job or the scan data printed within a predetermined period or within a predetermined range, or may use a material data selected by the UI section 11 by the user.

In the example shown in the "basic setting screen" 100 of FIG. 2, the print job or the scan data printed within the predetermined period or within the predetermined range is set to 200 pages, and among 200 pages, 150 pages are printed in full color based on the setting of the "full color" 310. The control section 10 calculates the index value of the full-color printing rate as 75%, which is calculated with 150 pages/200 pages, and displays the index value.

In addition, the control section 10 can read out the index value of the full-color printing rate relating to each identification information from the storage section 12 and can calculate the read out index value as well. The control section 10 can display, by the display panel of the UI section 11, each of the index of the full-color printing rate relating to each identification information, the calculated index value of the full-color printing rate, the set print color setting item, the consumption amount of ink, the print function, which is the first print format, or the copy function, which is the second print format, together with the identification information.

In a case in which the control section 10 displays the index value of the full-color printing rate calculated for each identification information by the UI section 11 as described above, the control section 10 can also set the print color setting item for each identification information. The control section 10 can control the print section 13 to execute printing based on the print color setting item set for each identification information.

In addition, the storage section 12 stores a threshold value of the full-color printing rate. The control section 10 compares the index value of the full-color printing rate calculated for each identification information with the threshold value of the full-color printing rate read out from the storage section 12. The control section 10 can specify the identification information of which the full-color printing rate is higher than the threshold value of the full-color printing rate, that is, which tends not to execute two-color printing.

The control section 10 can transmit the warning information indicating that the full-color printing rate is higher than the threshold value by the communication section 15 to the external device 2 that transmits the specified identification information.

When the specified identification information is acquired by the card reader, it is possible for the control section 10 not to permit the copy function and not to execute the copy. The control section 10 can display the warning information indicating that the full-color printing rate is higher than the threshold value on the UI section 11.

Here, a relationship between the selection of the button of the "print" 101 or the button of the "copy" 102 and the calculation of the index value by the control section 10 and setting of the setting item will be described in detail.

Figure 3:
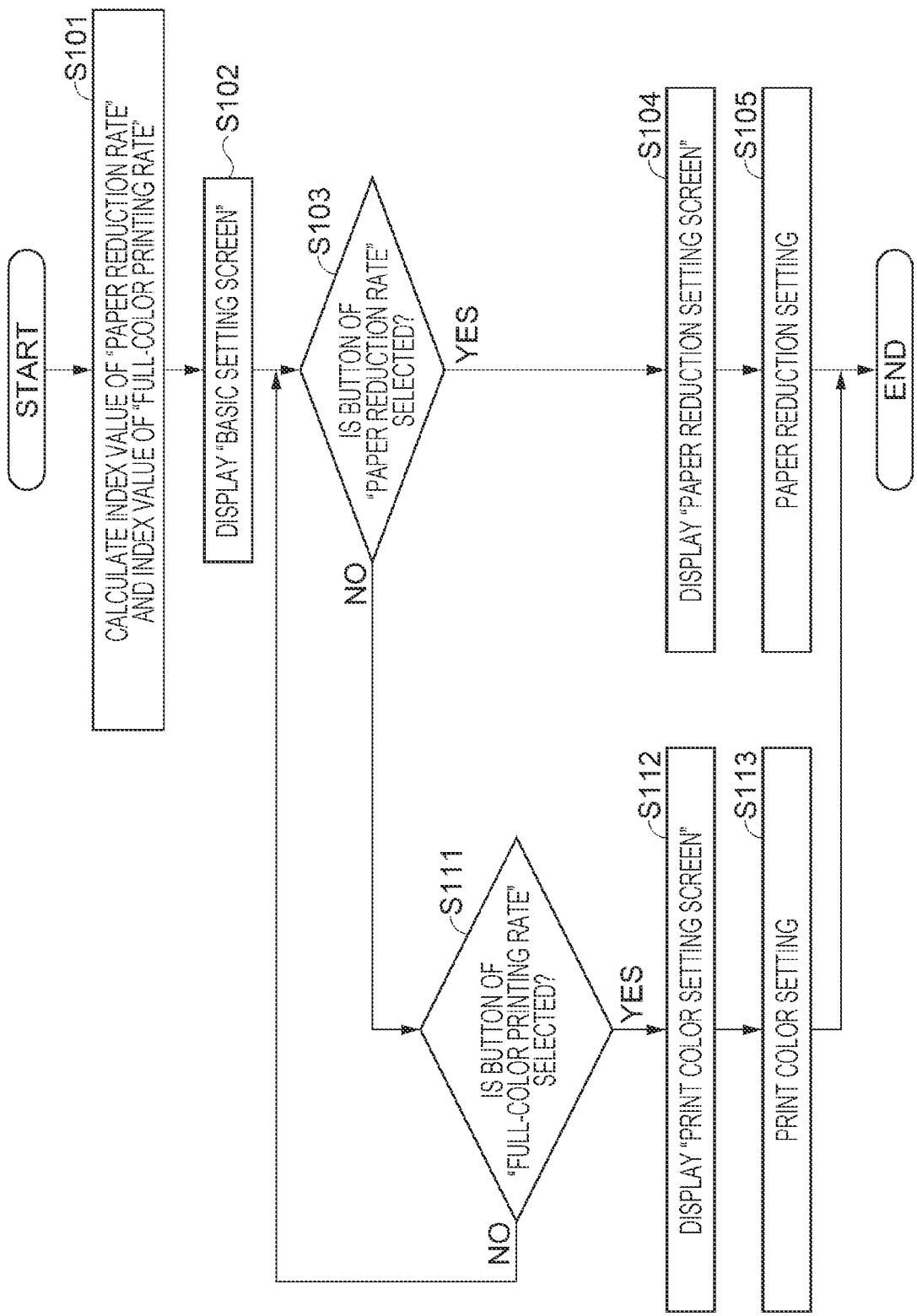
FIG. 3 is a flowchart showing a control of the transition of FIG. 2.

In the example shown in FIGS. 2 and 3, in a case in which the input indicating that the button of the "print" 101 is selected on the "basic setting screen" 100 is detected, the control section 10 calculates the index value of the "paper reduction rate" 110 relating to the print function and the index value of the "full-color printing rate" 120 relating to the print function and displays the index values by the display panel of the UI section 11. The paper reduction setting item and the print color setting item set by the "paper reduction setting screen" 200 or the "print color setting screen" 300 transitioned from the "basic setting screen" 100 are stored in the storage section 12 as being relating to the selected print function. The control section 10 reads out the setting item relating to the print function stored in the storage section 12 and controls the print section 13 to print the print job.

In a case in which the input indicating that the button of the "copy" 102 is selected on the "basic setting screen" 100 is detected, the control section 10 calculates the index value of the "paper reduction rate" 110 relating to the copy function and the index value of the "full-color printing rate" 120 relating to the copy function and displays the index values by the display panel of the UI section 11. The paper reduction setting item and the print color setting item set by the "paper reduction setting screen" 200 or the "print color setting screen" 300 transitioned from the "basic setting screen" 100 are stored in the storage section 12 as being relating to the selected copy function. The control section 10 reads out the setting item relating to the copy function stored in the storage section 12 and controls the print section 13 to print the scan data.

In a case in which the button of the "print" 101 or the button of the "copy" 102 is not selected on the "basic setting screen" 100, the control section 10 totals and calculates the index values of the "paper reduction rate" 110 relating to the print function and the copy function, and totals and calculates the index value of the "full-color printing rate" 120 relating to the copy function, and displays the index values by the display panel of the UI section 11.

In addition, the control section 10 stores the paper reduction setting item and the print color setting item set by the "paper reduction setting screen" 200 or the "print color setting screen" 300 transitioned from the "basic setting screen" 100 displayed by the display panel of the UI section 11 in the storage section 12 as being relating to the print function and the copy function. The control section 10 reads out the setting item stored in the storage section 12 and controls the print section 13 to print the print job and the scan data relating to the print function and the copy function.

It should be noted that the control section 10 counts and calculates the amount of ink of each color consumed by the head based on the number of shots, and stores the amount of ink in the storage section 12. The control section 10 can calculate the amount of ink consumed for each color, the amount of ink consumed during full-color printing, and the amount of ink consumed during two-color printing, can store each amount of ink in the storage section 12, and can display each amount of ink by the display panel of the UI section 11.

The control section 10 can display each amount of ink relating to the button of the "print" 101 or the button of the "copy" 102 by the display panel of the UI section 11 according to the selection of the button of the "print" 101 and the button of the "copy" 102.

A control in which the control section 10 transitions from the "basic setting screen" 100 shown in FIG. 2 to the "paper reduction setting screen" 200 or the "print color setting screen" 300 will be described with reference to FIG. 3.

The control section 10 starts the control, and totals and calculates the index value of the paper reduction rate for each print job or for each scan data printed within the predetermined period in the past or within the predetermined range from the storage section 12 (S101). For example, the index value of the paper reduction rate calculated by the control section 10 is 25%.

Similarly, the control section 10 totals and calculates the index value of the full-color printing rate for each print job or for each scan data printed within a predetermined period in the past or within a predetermined range from the storage section 12 (S101). For example, the index value of the full-color printing rate calculated by the control section 10 is 75%.

In a case in which the index value of the paper reduction rate and the index value of the full-color printing rate have already been calculated by the control section 10 and stored in the storage section 12, the control section 10 need only read out the index values from the storage section 12.

The control section 10 displays the "basic setting screen" 100 as shown in FIG. 2 as an example by the display panel of the UI section 11 (S102).

As shown in the "basic setting screen" 100 of FIG. 2, the control section 10 displays, by the display panel of the UI section 11, the "paper reduction rate" 110, which is the button indicating the index relating to the consumed paper, and 25%, which is the value calculated as the index value thereof, and the "full-color printing rate" 120, which is the button indicating the index relating to the consumed ink, and 75%, which is the value calculated as the index value thereof.

In addition, the control section 10 also displays the "print" 101, the "copy" 102, and the "scan" 103, which are the buttons for selecting the print function, the copy function, and the scan function, respectively, described above, by the display panel of the UI section 11.

The control section 10 determines whether or not the button of the "paper reduction rate" 110 is selected by the input detection of the detection panel of the UI section (S103), and when it is determined that the button is selected (S103: YES), transitions to the "paper reduction setting screen" 200 relating to the "paper reduction rate" 110 shown in FIG. 2, and displays the "paper reduction setting screen" 200 by the display panel of the UI section (S104).

When it is determined that any of the "single-sided→single-sided" 201, the "single-sided→double-sided" 202, and the "double-sided→double-sided" 203, which are the buttons for selecting the paper reduction setting items displayed on the "paper reduction setting screen" 200 of FIG. 2, is selected by the input detection of the detection panel of the UI section 11, the control section 10 stores the selected paper reduction setting item in the storage section 12 and makes the paper reduction setting (S105). The control section 10 terminates the control.

The control section 10 can detect the button of the "print" 101 or the "copy" 102 selected on the "basic setting screen" 100 by inputting from the detection panel of the UI section 11, can read out the paper reduction setting item relating to the selected print function or the copy function from the storage section 12, and can control the print section 13 to print the print job or the scan data.

On the other hand, when it is determined that the button of the "paper reduction rate" 110 is not selected by the input detection of the detection panel of the UI section (S103: NO), the control section 10 determines whether or not the button of the "full-color printing rate" 120 is selected on the detection panel of the UI section 11 (S111). When it is determined that the button of the "full-color printing rate" 120 is selected (S111: YES), the control section 10 transitions to the "print color setting screen" 300 relating to the "full-color printing rate" 120 shown in FIG. 2, and displays the "print color setting screen" 300 by the display panel of the UI section 11 (S112).

It should be noted that, when it is determined that the button of the "full-color printing rate" 120 is not selected (S111: NO), the control section 10 returns to the determination as to whether the button of the "paper reduction rate" 110 is selected (S103).

When it is determined that any of the "full color" 310, the "monochrome" 301, the "two colors (red and black)" 302, and the "two colors (another color and black)" 303, which are the buttons for selecting the print color setting items displayed on the "print color setting screen" 300 of FIG. 2, is selected by the input detection of the detection panel of the UI section 11, the control section 10 stores the selected print color setting item in the storage section 12 and makes the print color setting (S113). The control section 10 terminates the control.

The control section 10 can detect the button of the "print" 101 or the "copy" 102 selected on the "basic setting screen" 100 by inputting from the detection panel of the UI section 11, can read out the print color setting item relating to the selected print function or the copy function from the storage section 12, and can control the print section 13 to print the print job or the scan data.

As described above, as described with reference to FIGS. 2 and 3, the user can select the paper reduction setting item on the "paper reduction setting screen" 200 transitioned from the "basic setting screen" 100 and can select the print color setting item on the "print color setting screen" 300 with reference to the index value of the "paper reduction rate" 110 and the index value of the "full-color printing rate" 120 on the "basic setting screen" 100 displayed by the display panel of the UI section 11.

The control section 10 stores the selected paper reduction setting item and print color setting item in the storage section 12. When the print job is received by the communication section 15 or when the scan data is acquired by the read section 14, the control section 10 can read out the paper reduction setting item and the print color setting item from the storage section 12 and can control the print section 13 to print the print job or the scan data.

1-3. Setting Screen 2

As an example of a setting screen, a setting screen 2 shown in FIG. 4 will be described. In the example shown in FIG. 2 described above, the control section 10 transitions from the "basic setting screen" 100 to the "paper reduction setting screen" 200 or the "print color setting screen" 300.

Figure 4:
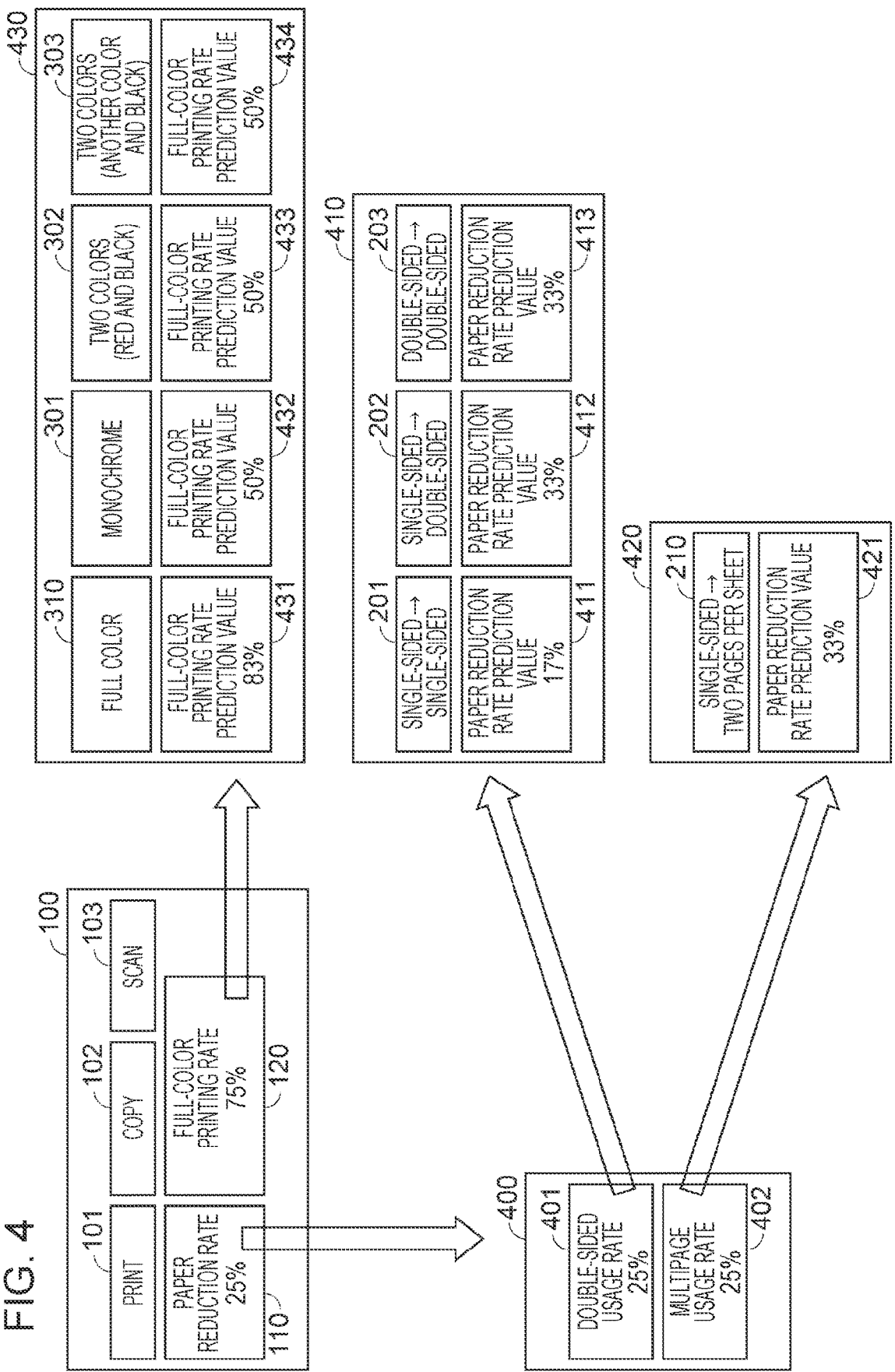
FIG. 4 is a transition diagram from the "basic setting screen" to the "paper reduction setting screen" via a "paper reduction usage rate screen".

On the other hand, in the example of setting the paper reduction setting item shown in FIG. 4, the control section 10 transitions from the "basic setting screen" 100 to a "double-sided printing setting screen" 410 or a "multipage printing setting screen" 420 via a "paper reduction usage rate screen" 400.

In addition, as shown in FIG. 4, the control section 10 calculates a prediction value for predicting the index value, and displays the index values as "paper reduction rate prediction values" 411, 412, 413, and 421, further as "full-color printing rate prediction values" 431, 432, 433, and 434 by the display panel of the UI section 11. It should be noted that, in the following description of FIG. 4, the contents overlapping with the case of FIG. 2 will be omitted.

As shown in the "basic setting screen" 100 of FIG. 4, the display panel of the UI section 11 displays the "paper reduction rate" 110, which is the button indicating the index relating to the consumed paper, and 25%, which is the calculated index value. When the user selects the button of the "paper reduction rate" 110, and touches the button with a finger, the detection panel of the UI section 11 detects the input indicating that the "paper reduction rate" 110 is selected. Based on this detection, as shown in FIG. 4, the control section 10 transitions to the "paper reduction usage rate screen" 400 and displays the "paper reduction usage rate screen" 400 by the display panel of the UI section 11.

As shown in the "paper reduction usage rate screen" 400 of FIG. 4, the display panel of the UI section 11 displays a "double-sided usage rate" 401, which is the button indicating the index of the double-sided printing relating to the consumed paper, and 25%, which is the index value thereof, and a "multipage usage rate" 402, which is the button indicating the index of the multipage printing relating to the consumed paper, and 25%, which is the index value thereof.

Here, each index and the index value thereof will be described with detailed examples. First, the "double-sided usage rate" 401 and the "multipage usage rate" 402 shown on the "paper reduction usage rate screen" 400 of FIG. 4 will be described.

As an example, the print jobs for the past three times printed by the print section 13 by the control section 10 and the setting of the paper reduction setting item in that case are as follows. A first print job is for 50 pages, in which "single-sided→double-sided" 202 is set, a second print job is for 50 pages, in which the "single-sided→two pages per sheet" 210 is set, and a third print job is for 100 pages, in which the "single-sided→single-sided" 201 is set.

These print jobs for three times are for 200 pages in total. Since the "double-sided usage rate" 401 calculated by the control section 10 is for 50 pages of the first print job, the index value is 25%, which is calculated with 50 pages/200 pages. Since the "multipage usage rate" 402 calculated by the control section 10 is for 50 pages of the second print job, the index value is 25%, which is calculated with 50 pages/ 200 pages.

These calculated values are displayed by the display panel of the UI section 11 as the index value 25% of the "double-sided usage rate" 401 and the index value 25% of the "multipage usage rate" 402 shown on the "paper reduction usage rate screen" 400 of FIG. 4.

Next, returning to the "basic setting screen" 100 of FIG. 4, the index value of the "paper reduction rate" 110 calculated by the control section 10 will be described.

Since the first print job is set to "single-sided→double-sided" 202, the control section 10 prints 50 pages on 25 sheets of paper by the print section 13. Since the second print job is set to "single-sided→two pages per sheet" 210, the control section 10 prints 50 pages on 25 sheets of paper by the print section 13. Since the third print job is set to "single-sided→single-sided" 201, the control section 10 prints 100 pages on 100 sheets of paper by the print section 13. Since the printing jobs for three times are for 200 pages in total, in a case in which the paper reduction setting item for reducing the paper is not set, the control section 10 executes printing on 200 sheets of paper by the print section 13.

The "paper reduction rate" 110 calculated by the control section 10 is a value obtained by dividing the number of sheets of paper actually reduced by the number of sheets of paper that is used for printing in a case in which the number of sheets of paper is not reduced. The number of sheets of paper reduced is the value obtained by subtracting the number of sheets of paper actually reduced from the number of sheets of paper that is used for printing in a case in which the number of sheets of paper is not reduced.

Specifically, the control section 10 calculates the first print job with (50 sheets−25 sheets)/50 sheets, the second print job with (50 sheets−25 sheets)/50 sheets, and the third print job with (100 sheets−100 sheets)/100 sheets. That is, the control section 10 calculates the index value as 25% with (25 sheets+25 sheets+0 sheet)/200 sheets. This value is displayed by the display panel of the UI section 11 as the index value 25% of the "paper reduction rate" 110 shown in the "basic setting screen" 100 of FIG. 4.

The user can make any setting with reference to the index value of the "double-sided usage rate" 401 and the index value of the "multipage usage rate" 402 shown on the "paper reduction usage rate screen" 400 of FIG. 4, which is displayed on the display panel of the UI section 11.

For example, when the user selects a button of the "double-sided usage rate" 401, which is the index displayed on the display panel of the UI section 11, and touches the button with a finger, the detection panel of the UI section 11 detects the input indicating that the "double-sided usage rate" 401 is selected.

When the input indicating that the "double-sided usage rate" 401 is selected is detected on the detection panel of the UI section 11, the control section 10 transitions to the "double-sided printing setting screen" 410 relating to the double-sided setting shown in FIG. 4, and displays the "double-sided printing setting screen" 410 by the display panel of the UI section 11.

On the "double-sided printing setting screen" 410 shown in FIG. 4, based on the selection of the button indicating the paper reduction setting item by the user, the control section 10 calculates the prediction value for predicting the index value corresponding to the paper reduction setting item in a case in which the paper reduction setting item is set, and displays the prediction value by the display panel of the UI section 11 as the "paper reduction rate prediction values" 411, 412, and 413.

Specifically, on the "double-sided printing setting screen" 410 shown in FIG. 4, the control section 10 adds, with respect to the "paper reduction setting screen" 200 of FIG. 2, the "paper reduction rate prediction values" 411, 412, and 413, which are the prediction values for predicting the index values of each "paper reduction rate" 110 to the "single-sided→single-sided" 201, the "single-sided→double-sided" 202, and the "double-sided→double-sided" 203, which are the buttons indicating the paper reduction setting items, and displays the "paper reduction rate prediction values" 411, 412, and 413 by the display panel of the UI section 11.

As an example, the control section 10 calculates the prediction value for a case in which a fourth print job is executed after the print jobs for three times described above are executed. The fourth print job used by the control section 10 to calculate the prediction value is the same as the third print job immediately previously printed by the print section 13.

The control section 10 calculates, for the fourth print job, the "paper reduction rate prediction values" 411, 412, and 413 in a case in which the paper reduction setting items are set in the "single-sided→single-sided" 201, the "single-sided→double-sided" 202, and the "double-sided→double-sided" 203, respectively. It should be noted that the index value calculated by the control section 10 is a cumulative total of the print jobs for four times from the first to the fourth.

The index value of the "paper reduction rate" 110 of the print jobs for three times calculated by the control section 10 is 25%, which is calculated with (25 sheets+25 sheets+0 sheet)/200 sheets, as shown in the "paper reduction rate" 110.

Since the fourth print job is for 100 pages, the number of sheets of paper to be printed is 100 sheets in a case in which the "single-sided→single-sided" 201 is set, and the number of sheets of paper reduced is zero sheet. The prediction value calculated by the control section 10 is 17%, which is calculated with (25 sheets+25 sheets+0 sheet+0 sheet)/(200 sheets+100 sheets). The index value 17% of the "paper reduction rate prediction value" 411 is displayed by the display panel of the UI section 11.

Similarly, in a case in which the control section 10 sets the "single-sided→double-sided" 202 or the "double-sided-→double-sided" 203, the number of sheets of paper to be printed is 50, and the number of sheets of paper reduced is 50 sheets. Therefore, the prediction value is calculated as 33% with (25 sheets+25 sheets+0 sheet+50 sheets)/(200 sheets+100 sheets), and the prediction value is displayed by the display panel of the UI section 11 as the index value 33% of the "paper reduction rate prediction values" 412 and 413.

The user can set the paper reduction setting item with reference to the paper reduction setting items, such as the "single-sided→single-sided" 201, the "single-sided-→double-sided" 202, and the "double-sided→double-sided" 203, which are displayed on the display panel of the UI section 11, as well as the "paper reduction rate prediction values" 411, 412, and 413, which are the prediction values thereof.

When the user selects the button of any of the paper reduction setting items and touches the button with a finger, the detection panel of the UI section 11 detects the input indicating that the setting item of the touched button is set, so that the control section 10 can store the detected setting item in the storage section 12 and can make double-sided printing setting, which is a paper reduction setting, which can be used for controlling the print section 13.

It should be noted that the user can optionally set the print job, the number of pages, or the like, which is the target when the control section 10 calculates the prediction value. In this case, the control section 10 need only provide a box for setting the print job, the number of pages, or the like, which is the target when the prediction value is calculated, on the "double-sided printing setting screen" 410 of the UI section 11. The control section 10 can acquire the print job, the number of pages, or the like input or selected in the box, and can calculate the prediction value.

Next, regarding the "single-sided→two pages per sheet" 210 on the "multipage printing setting screen" 420 shown in FIG. 4 and the "paper reduction rate prediction value" 421, which is the prediction value for predicting the index value of the "paper reduction rate" 110, will be described.

For example, when the user selects a button of the "multipage usage rate" 402, which is the index displayed on the display panel of the UI section 11, and touches the button with a finger, the detection panel of the UI section 11 detects the input indicating that the "multipage usage rate" 402 is selected.

When the input indicating that the "multipage usage rate" 402 is selected is detected on the detection panel of the UI section 11, the control section 10 transitions to the "multipage printing setting screen" 420 relating to the multipage setting shown in FIG. 4, and displays the "multipage printing setting screen" 420 by the display panel of the UI section 11.

On the "multipage printing setting screen" 420 shown in FIG. 4, based on the selection of the button indicating the paper reduction setting item by the user, the control section 10 calculates the prediction value for predicting the index value corresponding to the paper reduction setting item in a case in which the paper reduction setting item is set, and displays the prediction value by the display panel of the UI section 11 as the "paper reduction rate prediction value" 421.

Specifically, on the "multipage printing setting screen" 420 shown in FIG. 4, the control section 10 adds, with respect to the "paper reduction setting screen" 200 of FIG. 2, the "paper reduction rate prediction value" 421, which is the prediction value for predicting the index value of the "paper reduction rate" 110, to the "single-sided→two pages per sheet" 210, which is the button indicating the paper reduction setting item, and displays the "paper reduction rate prediction value" 421 by the display panel of the UI section 11.

As an example, the control section 10 calculates the prediction value for a case in which the fourth print job is executed after the print jobs for three times described above are executed. The fourth print job used by the control section 10 to calculate the prediction value is the same as the third print job immediately previously printed by the print section 13.

For the fourth print job, the control section 10 calculates the "paper reduction rate prediction value" 421 in a case in which the paper reduction setting item is set in the "single-sided→two pages per sheet" 210. It should be noted that the index value to be calculated is a cumulative total of the print jobs for four times from the first to the fourth.

The index value of the "paper reduction rate" 110 of the print jobs for three times calculated by the control section 10 is 25%, which is calculated with (25 sheets+25 sheets+0 sheet)/200 sheets, as shown in the "paper reduction rate" 110.

Since the fourth print job is for 100 pages, the number of sheets of paper to be printed is 50 sheets in a case in which "single-sided→two pages per sheet" 210 is set, and the prediction value calculated by the control section 10 is 33%, which is calculated with (25 sheets+25 sheets+0 sheet+50 sheets)/(200 sheets+100 sheets). The index value 33% of the "paper reduction rate prediction value" 421 is displayed by the display panel of the UI section 11.

The user can set the paper reduction setting item with reference to the paper reduction setting item of the "single-sided→two pages per sheet" 210 displayed by the display panel of the UI section 11, as well as the "paper reduction rate prediction value" 421, which is the prediction value thereof.

Specifically, when the user selects the button of the "single-sided→two pages per sheet" 210 and touches the button with a finger, the detection panel of the UI section 11 detects the input indicating that the setting item of the touched button is set. The control section 10 can store the detected setting item in the storage section 12 and can make the multipage setting of the paper, which can be used for controlling the print section 13.

Next, the prediction value for predicting the index value of the full-color printing rate on a "print color setting screen" 430 shown in FIG. 4 will be described. In the following description of FIG. 4, the contents overlapping with the case of FIG. 2 will be omitted.

As shown in the "basic setting screen" 100 of FIG. 4, the display panel of the UI section 11 displays the "full-color printing rate" 120, which is the button indicating the index of the full-color printing rate, and 75%, which is the calculated index value. When the user selects the button of the "full-color printing rate" 120, and touches the button with a finger, the detection panel of the UI section 11 detects the input indicating that the "full-color printing rate" 120 is selected. Based on this detection, as shown in FIG. 4, the control section 10 transitions to the "print color setting screen" 430 and displays the "print color setting screen" 430 by the display panel of the UI section 11.

On the "print color setting screen" 430 shown in FIG. 4, based on the selection of the button indicating the print color setting item by the user, the control section 10 calculates the prediction value for predicting the index value corresponding to the print color setting item in a case in which the print color setting item is set, and displays the prediction value by the display panel of the UI section 11 as the "full-color printing rate prediction values" 431, 432, 433, and 434.

Specifically, on the "print color setting screen" 430 shown in FIG. 4, the control section 10 adds, with respect to the "print color setting screen" 300 of FIG. 2, the "full-color printing rate prediction values" 431, 432, 433, and 434, which are the prediction values for predicting the index value of each "full-color printing rate" 120 to the "full color" 310, the "monochrome" 301, the "two colors (red and black)" 302, and the "two colors (another color and black)" 303, which are the buttons indicating the print color setting items, and displays the "full-color printing rate prediction values" 431, 432, 433, and 434 by the display panel of the UI section 11.

The print jobs for the past three times printed by the print section 13 by the control section 10 and the setting of the print color setting item are as follows. The first print job is for 50 pages, in which "monochrome" 301 is set, the second print job is for 50 pages, in which the "full color" 310 is set, and the third print job is for 100 pages, in which the "full color" 310 is set.

These print jobs for three times are for 200 pages in total. The "full color" 310 is set for 150 pages of the second and third print jobs, so that the index value of the "full-color printing rate" 120 calculated by the control section 10 is calculated as 75% with 150 pages/200 pages.

As an example, the control section 10 calculates the prediction value for a case in which the fourth print job is executed after the print jobs for three times described above are executed. The fourth print job used by the control section 10 to calculate the prediction value is the same as the third print job immediately previously printed by the print section 13.

The control section 10 calculates, for the fourth print job, the "full-color printing rate prediction values" 431, 432, 433, and 434 in a case in which the print color setting item is set to each of the "full color" 310, the "monochrome" 301, the "two colors (red and black)" 302, and the "two colors (another color and black)" 303. It should be noted that the index value to be calculated is a cumulative total of the print jobs for four times from the first to the fourth.

Since the fourth print job is for 100 pages, the "full color" 310 is set for 100 pages, and the prediction value calculated by the control section 10 is 83%, which is calculated with (150 pages+100 pages)/(200 pages+100 pages). The index value 83% of the "full-color printing rate prediction value" 431 is displayed by the display panel of the UI section 11.

Similarly, since the control section 10 sets the "monochrome" 301, the "two colors (red and black)" 302, and the "two colors (another color and black)" 303 for zero page, the prediction values calculated by the control section 10 are 50%, respectively, which are calculated with (150 pages)/(200 pages+100 pages). Each index value 50% of the "full-color printing rate prediction values" 432, 433, and 434 is displayed by the display panel of the UI section 11.

The user can set the print color setting item with reference to the print color setting items, such as the "full color" 310, the "monochrome" 301, the "two colors (red and black)" 302, and the "two colors (another color and black)" 303 displayed by the display panel of the UI section 11, as well as the "full-color printing rate prediction values" 431, 432, 433, and 434, which are the prediction values thereof.

When the user selects the button of any of the print color setting items and touches the button with a finger, the detection panel of the UI section 11 detects the input indicating that the setting item of the touched button is set. The control section 10 can store the detected setting item in the storage section 12, which can be used for controlling the print section 13.

Figure 5:
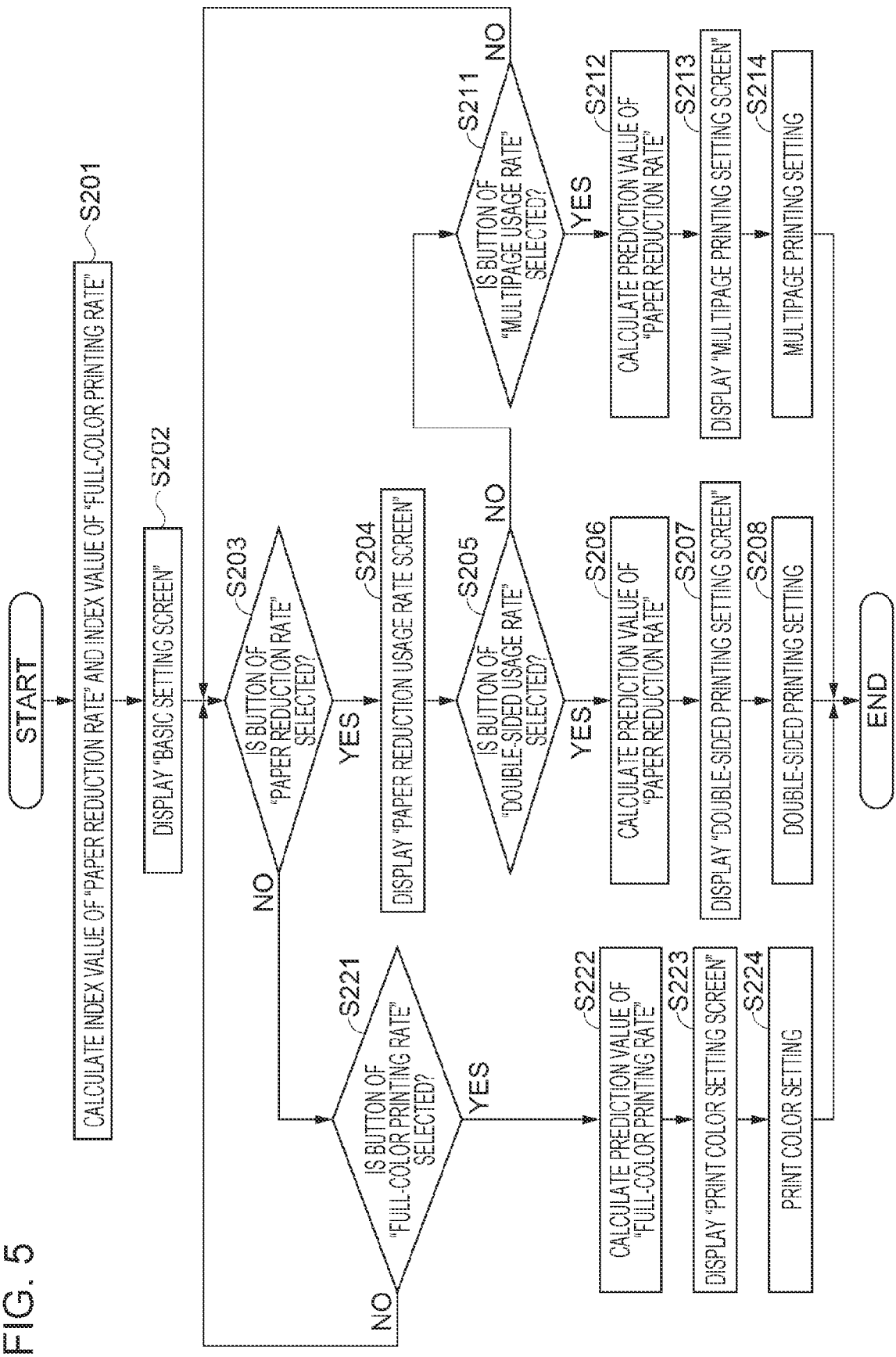
FIG. 5 is a flowchart showing a control of the transition of FIG. 4.

Next, with reference to FIG. 5, the control will be described in which the control section 10 transitions from the "basic setting screen" 100 to the "double-sided printing setting screen" 410 or the "multipage printing setting screen" 420 via the "paper reduction usage rate screen" 400 shown in FIG. 4.

In addition, a control will be described in which the control section 10 calculates a prediction value for predicting the index value, and displays the index values as "paper reduction rate prediction values" 411, 412, 413, and 421, further as "full-color printing rate prediction values" 431, 432, 433, and 434 by the display panel of the UI section 11. It should be noted that, in the following description of FIG. 5, the contents overlapping with the case of FIG. 3 will be omitted.

The control section 10 starts the control, and calculates, from the storage section 12, the index value of the paper reduction rate and the index value of the full-color printing rate for each print job or for each scan data within a predetermined period or within a predetermined range (S201). For example, the index value of the paper reduction rate calculated by the control section 10 is 25%, and the index value of the calculated full-color printing rate is 75%.

The control section 10 displays the "basic setting screen" 100 as shown in FIG. 4, including the calculated index value of the paper reduction rate, by the display panel of the UI section 11 (S202).

The control section 10 determines whether or not the button of the "paper reduction rate" 110 is selected by the input detection of the detection panel of the UI section (S203), and when it is determined that the button is selected (S203: YES), displays the "paper reduction usage rate screen" 400 shown in FIG. 4 by the display panel of the UI section 11 (S204).

The control section 10 displays, on the "paper reduction usage rate screen" 400, the "double-sided usage rate" 401 and 25%, which is the index value thereof, and the "multipage usage rate" 402, which is the button indicating the index of the multipage printing relating to the consumed paper, and 25%, which is the index value thereof, by the display panel of the UI section 11.

The control section 10 determines whether or not the button of the "double-sided usage rate" 401 is selected by the input detection of the detection panel of the UI section 11 (S205), and when it is determined that the button is selected (S205: YES), calculates the prediction value for predicting the index value corresponding to the paper reduction setting item relating to the "paper reduction rate" 110 (S206).

Specifically, the calculation of the prediction value is as in the example described in FIG. 4 above. The control section 10 calculates, for a case in which the fourth print job is executed after the print jobs for three times are executed, 17%, 33%, and 33% as the "paper reduction rate prediction values" 411, 412, and 413 in a case in which the paper reduction setting items are set in the "single-sided→single-sided" 201, the "single-sided→double-sided" 202, and the "double-sided→double-sided" 203, respectively.

The control section 10 displays the "double-sided printing setting screen" 410 including these "paper reduction rate prediction values" 411, 412, and 413 by the display panel of the UI section 11 (S207).

When the user selects the button of any of the paper reduction setting items displayed on the "double-sided printing setting screen" 410 and touches the button with a finger, the detection panel of the UI section 11 detects the input indicating that the setting item of the touched button is set. The control section 10 can store the detected setting item in the storage section 12 and can make the double-sided printing setting (S208), which can be used for controlling the print section 13. The control section 10 terminates the control.

When it is determined that the button of the "double-sided usage rate" 401 is not selected (S205: NO), the control section 10 determines whether or not the button of the "multipage usage rate" 402 is selected by the input detection of the detection panel of the UI section 11 (S211), and when it is determined that the button is selected (S211: YES), calculates the prediction value for predicting the index value corresponding to the paper reduction setting item relating to the "paper reduction rate" 110 (S212).

It should be noted that, when it is determined that the button of the "multipage usage rate" 402 is not selected (S211: NO), the control section 10 returns to the determination as to whether the button of the "paper reduction rate" 110 is selected (S203).

Specifically, the calculation of the prediction value is as in the example described in FIG. 4 above. The control section 10 calculates, for a case in which the fourth print job is executed after the print jobs for three times are executed, 33% as the "paper reduction rate prediction value" 421 in a case in which the paper reduction setting item is set in the "single-sided→two pages per sheet" 210.

The control section 10 displays the "multipage printing setting screen" 420 including the "paper reduction rate prediction value" 421 by the display panel of the UI section 11 (S213).

Specifically, when the user selects the button of the "single-sided→two pages per sheet" 210 displayed on the "multipage printing setting screen" 420 and touches the button with a finger, the detection panel of the UI section 11 detects the input indicating that the setting item of the touched button is set. The control section 10 can store the detected setting item in the storage section 12 and can make the multipage printing setting (S214), which can be used for controlling the print section 13. The control section 10 terminates the control.

On the other hand, when it is determined that the button of the "paper reduction rate" 110 is not selected by the input detection of the detection panel of the UI section (S203: NO), the control section 10 determines whether or not the button of the "full-color printing rate" 120 is selected on the detection panel of the UI section 11 (S221). When it is determined that the button of the "full-color printing rate" 120 is selected (S221: YES), the control section 10 calculates the prediction value for predicting the index value corresponding to the print color setting item relating to the "full-color printing rate" 120 (S222). It should be noted that, when it is determined that the button of the "full-color printing rate" 120 is not selected (S221: NO), the control section 10 returns to the determination as to whether the button of the "paper reduction rate" 110 is selected (S203).

Specifically, the calculation of the prediction value is as in the example described in FIG. 4 above. The control section 10 calculates, for a case in which the fourth print job is executed after the print jobs for three times are executed, 83%, 50%, 50%, and 50% as the "full-color printing rate prediction values" 431, 432, 433, and 434 in a case in which the print color setting item is set to each of the "full color" 310, the "monochrome" 301, the "two colors (red and black)" 302, and the "two colors (another color and black)" 303.

The control section 10 displays the "print color setting screen" 430 including these "full-color printing rate prediction values" 431, 432, 433, and 434 by the display panel of the UI section 11 (S223).

When the user selects the button of any of the print color setting items displayed on the "print color setting screen" 430 and touches the button with a finger, the detection panel of the UI section 11 detects the input indicating that the setting item of the touched button is set. The control section 10 can store the detected setting item in the storage section 12 and can make the print color setting (S224), which can be used for controlling the print section 13. The control section 10 terminates the control.

1-4. Setting Screen 3

As an example of a setting screen, a setting screen 3 shown in FIG. 6 will be described. In the example shown in FIG. 2 above, the control section 10 does not show the print function or the copy function on the "paper reduction setting screen" 200 or the "print color setting screen" 300 transitioned from the "basic setting screen" 100.

Figure 6:
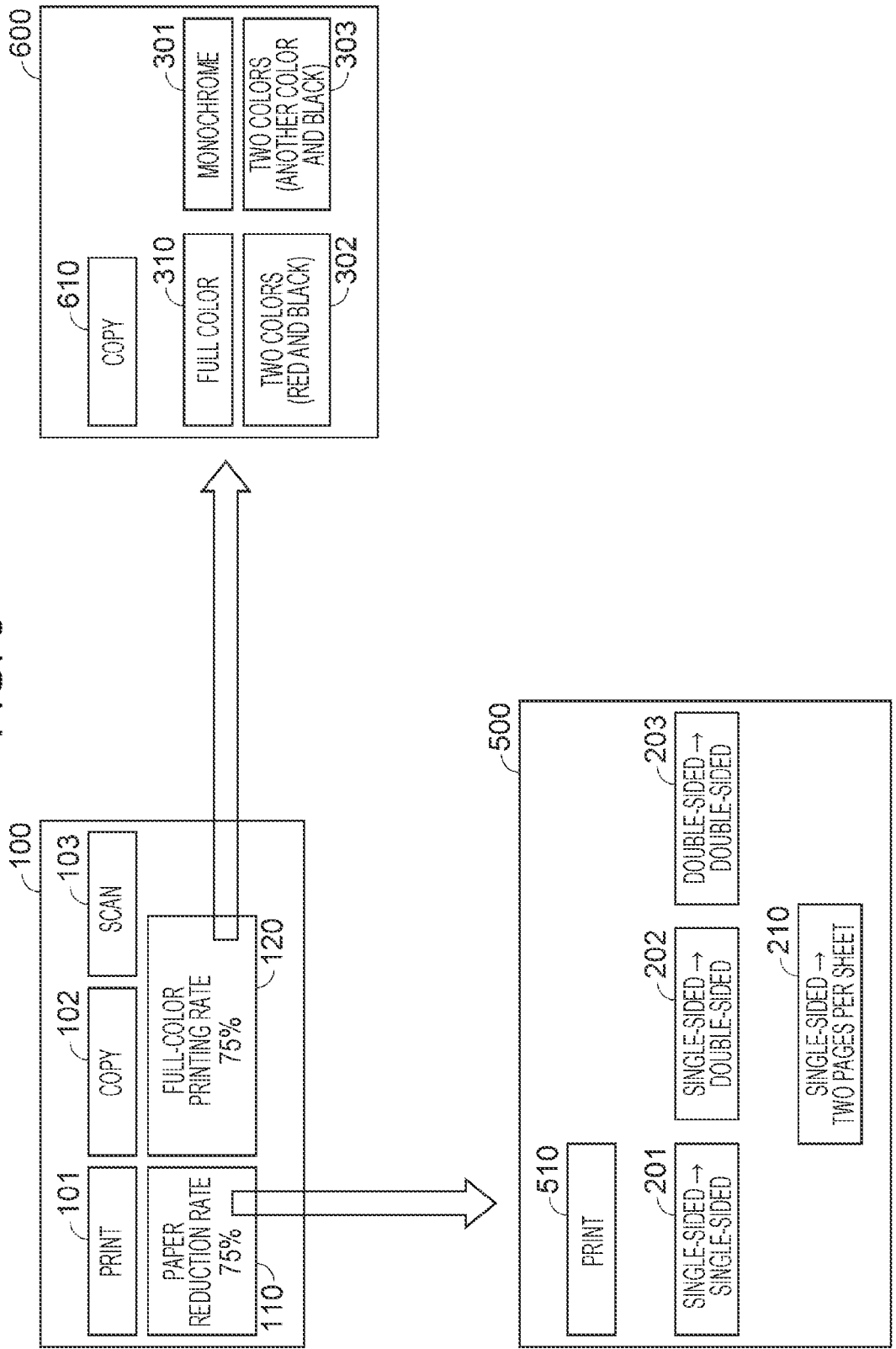
FIG. 6 is a transition diagram from the "basic setting screen" to the "paper reduction setting screen" or the "print color setting screen" in which "print" or "copy" is selected.

In the example shown in FIG. 6, the control section 10 displays, by the display panel of the UI section 11, the print function indicating the first print format as "print" 510 or the copy function indicating the selected second print format as "copy" 610 to be included in each of a "paper reduction setting screen" 500 or a "print color setting screen" 600 transitioned from the "basic setting screen" 100. It should be noted that, in the following description of FIG. 6, the contents overlapping with the case of FIG. 2 will be omitted.

Even in a case in which the button of the "print" 101 or the button of the "copy" 102 is not selected on the "basic setting screen" 100, when the input indicating that the "paper reduction rate" 110 or the "full-color printing rate" 120, which is the index, is selected is detected by the detection panel of the UI section 11, the control section 10 selects any of the print function or the copy function based on a predetermined condition.

As shown in FIG. 6, the control section 10 displays the selected print function as the "print" 510 or the selected copy function as the "copy" 610 to be included in each of the "paper reduction setting screen" 500 or the "print color setting screen" 600 by the display panel of the UI section 11.

The control section 10 stores the paper reduction setting item set by the "paper reduction setting screen" 500 and the print color setting item set by the "print color setting screen" 600 in the storage section 12 in association with the selected print function or copy function.

When the print job is received by the communication section 15 or when the scan data is acquired by the read section 14, the control section 10 can read out the paper reduction setting item and the print color setting item associated with the selected print function or copy function from the storage section 12 and can control the print section 13 to print the print job or the scan data.

Here, an example of the predetermined condition in a case in which the control section 10 selects the print function or the copy function will be described.

It is preferable that the control section 10 select the print function as the predetermined condition in a case in which the communication section 15 can communicate with the external device 2. This is because the control section 10 has a high possibility of receiving the print job from the external device 2 by the communication section 15 and printing the received print job by the print section 13.

It is preferable that the control section 10 select the print function as the predetermined condition also in a case in which the communication section 15 can communicate with an external storage device other than the external device 2. This is because the control section 10 has a high possibility of receiving the print job from the external storage device by the communication section 15 and printing the received print job by the print section 13.

It is preferable that the control section 10 select the copy function as the predetermined condition in a case in which the document is detected by a detector provided in the document transport mechanism of the read section 14. This is because the control section 10 has a high possibility of reading the document of the read section 14 and printing the read document by the print section 13.

The storage section 12 stores the past index value of the "paper reduction rate" 110 and the past index value of the "full-color printing rate" 120 for each print function and for each copy function.

It is preferable that the control section 10 refer to the storage section 12 and select the print function or the copy function of a higher value among the past index value of the "paper reduction rate" 110 or the past index value of the "full-color printing rate" 120 as the predetermined condition. This is because there is a high possibility that the user sets the "paper reduction rate" 110 or the "full-color printing rate" 120 of the print function or the copy function having the higher index value to be lower.

The storage section 12 stores the past consumption amount of paper and the past consumption amount of ink for each print function and for each copy function.

It is preferable that the control section 10 refer to the storage section 12 and select the print function or the copy function of a higher consumption amount among the past consumption amount of paper or the past consumption amount of ink as the predetermined condition. This is because there is a high possibility that the user sets the "paper reduction rate" 110 of the print function or the copy function having the higher consumption amount to be higher or the "full-color printing rate" 120 to be lower.

Figure 7:
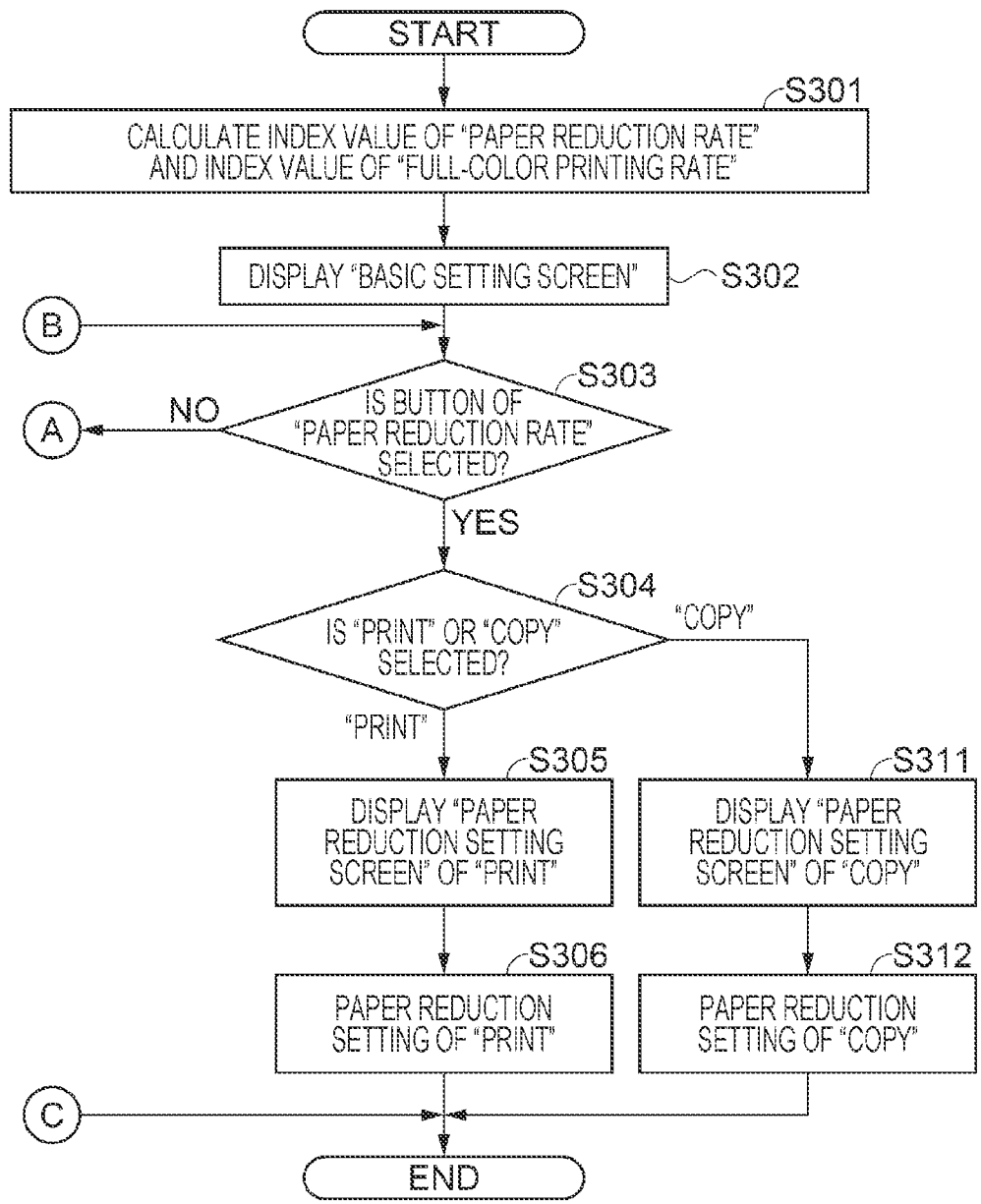
FIG. 7 is a flowchart showing a control of the transition of FIG. 6.
Figure 8:
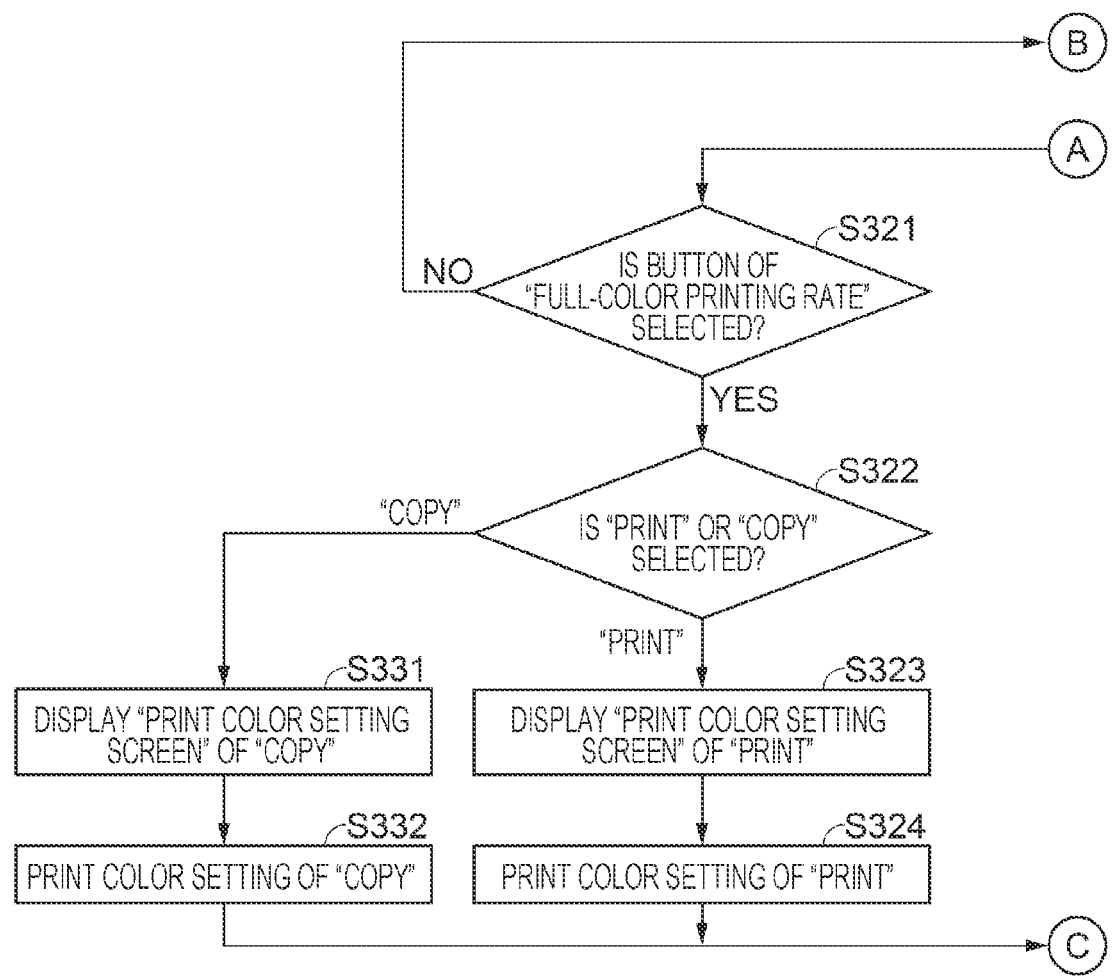
FIG. 8 is a diagram showing a part of the flowchart of FIG. 7.

Next, a control in which the control section 10 transitions from the "basic setting screen" 100 to the "paper reduction setting screen" 500 or the "print color setting screen" 600 shown in FIG. 6 will be described with reference to FIGS. 7 and 8. It should be noted that, in the following description of FIGS. 7 and 8, the contents overlapping with the case of FIG. 3 will be omitted. In addition, FIGS. 7 and 8 are coupled by a connection terminal.

The control section 10 starts the control, and calculates, from the storage section 12, the index value of the paper reduction rate and the index value of the full-color printing rate for each print job or for each scan data within a predetermined period or within a predetermined range (S301).

The control section 10 displays the "basic setting screen" 100 shown in FIG. 6, including the calculated index value of the paper reduction rate, by the display panel of the UI section 11 (S302).

The control section 10 determines whether or not the button of the "paper reduction rate" 110 is selected by the input detection of the detection panel of the UI section (S303), and when it is determined that the button is selected (S303: YES), selects the "print" 510 indicating the print function or the "copy" 610 indicating the copy function based on the predetermined condition (S304). The predetermined condition is as described above.

When it is determined that the "print" 510 is selected (S304: "print"), the control section 10 displays the selected "print" 510 to be included in the "paper reduction setting screen" 500 as shown in FIG. 6 by the display panel of the UI section 11 (S305).

The control section 10 stores and sets the paper reduction setting item set by the "paper reduction setting screen" 500 in the storage section 12 in association with the selected "print" 510 (S306). When the print job is received by the communication section 15, the control section 10 can read out the paper reduction setting item associated with the "print" 510 from the storage section 12 and can control the print section 13 to execute printing. The control section 10 terminates the control.

On the other hand, when it is determined that the "copy" 610 is selected (S304: "copy"), the control section 10 displays the "copy" 610 instead of the "print" 510 on the "paper reduction setting screen" 500 of FIG. 6 by the display panel of the UI section 11 (S311).

The control section 10 stores and sets the paper reduction setting item set by the "paper reduction setting screen" 500 in the storage section 12 in association with the selected "copy" 610 (S312). When the scan data is acquired by the read section 14, the control section 10 can read out the paper reduction setting item associated with the "copy" 610 from the storage section 12 and can control the print section 13 to execute printing. The control section 10 terminates the control.

By the way, when it is determined that the button of the "paper reduction rate" 110 is not selected by the input detection of the detection panel of the UI section 11 (S303: NO), as shown in FIG. 8, the control section 10 determines whether or not the button of the "full-color printing rate" 120 is selected on the detection panel of the UI section 11 (S321). When it is determined that the button of the "full-color printing rate" 120 is selected (S321: YES), the control section 10 selects the "print" 510 indicating the print function or the "copy" 610 indicating the copy function based on the predetermined condition. (S322). The predetermined condition is as described above.

It should be noted that, when it is determined that the button of the "full-color printing rate" 120 is not selected (S321: NO), as shown in FIG. 7, the control section 10 returns to the determination as to whether the button of the "paper reduction rate" 110 is selected (S303).

As shown in FIG. 8, when it is determined that the "copy" 610 is selected (S322: "copy"), as shown in FIG. 6, the control section 10 displays the selected "copy" 610 to be included on the "print color setting screen" 600 by the display panel of the UI section 11 (S331).

The control section 10 stores and sets the print color setting item set by the "print color setting screen" 600 in the storage section 12 in association with the selected "copy" 610 (S332). When the scan data is acquired by the read section 14, the control section 10 can read out the print color setting item associated with the "copy" 610 from the storage section 12 and can control the print section 13 to execute printing. The control section 10 terminates the control.

On the other hand, as shown in FIG. 8, when it is determined that the "print" 510 is selected (S322: "print"), the control section 10 displays the "print" 510 instead of the "copy" 610 on the "print color setting screen" 600 of FIG. 6 by the display panel of the UI section 11 (S323).

The control section 10 stores and sets the print color setting item set by the "print color setting screen" 600 in the storage section 12 in association with the selected "print" 510 (S324). When the print job is received by the communication section 15, the control section 10 can read out the paper reduction setting item associated with the "print" 510 from the storage section 12 and can control the print section 13 to execute printing. The control section 10 terminates the control.

1-5. Setting Screen 4

As an example of a setting screen, a setting screen 4 shown in FIG. 9 will be described. In the example shown in FIG. 9, the control section 10 reads out the history of the paper reduction setting item and the print color setting item set in the past and stored in the storage section 12, or the registration of the specific paper reduction setting item and the print color setting stored in the storage section 12 as a "favorite" menu, and displays the history or the registration by the display panel of the UI section 11. It should be noted that, in the following description of FIG. 9, the contents overlapping with the case of FIG. 2 will be omitted.

The control section 10 registers a specific item selected by the user as the history or the "favorite" menu in the order of the set time and stores the specific item in the storage section 12 in association with the paper reduction rate, which is the index, the index value of the paper reduction rate, the set paper reduction setting item, the identification information, the consumption amount of paper, the print function, or the copy function.

In addition, the control section 10 registers a specific item selected by the user as the history or the "favorite" menu in the order of the set time and stores the specific item in the storage section 12 in association with the full-color printing rate, which is the index, and the index value thereof, the set print color setting item, the identification information, the consumption amount of ink, the print function, or the copy function.

Figure 9:
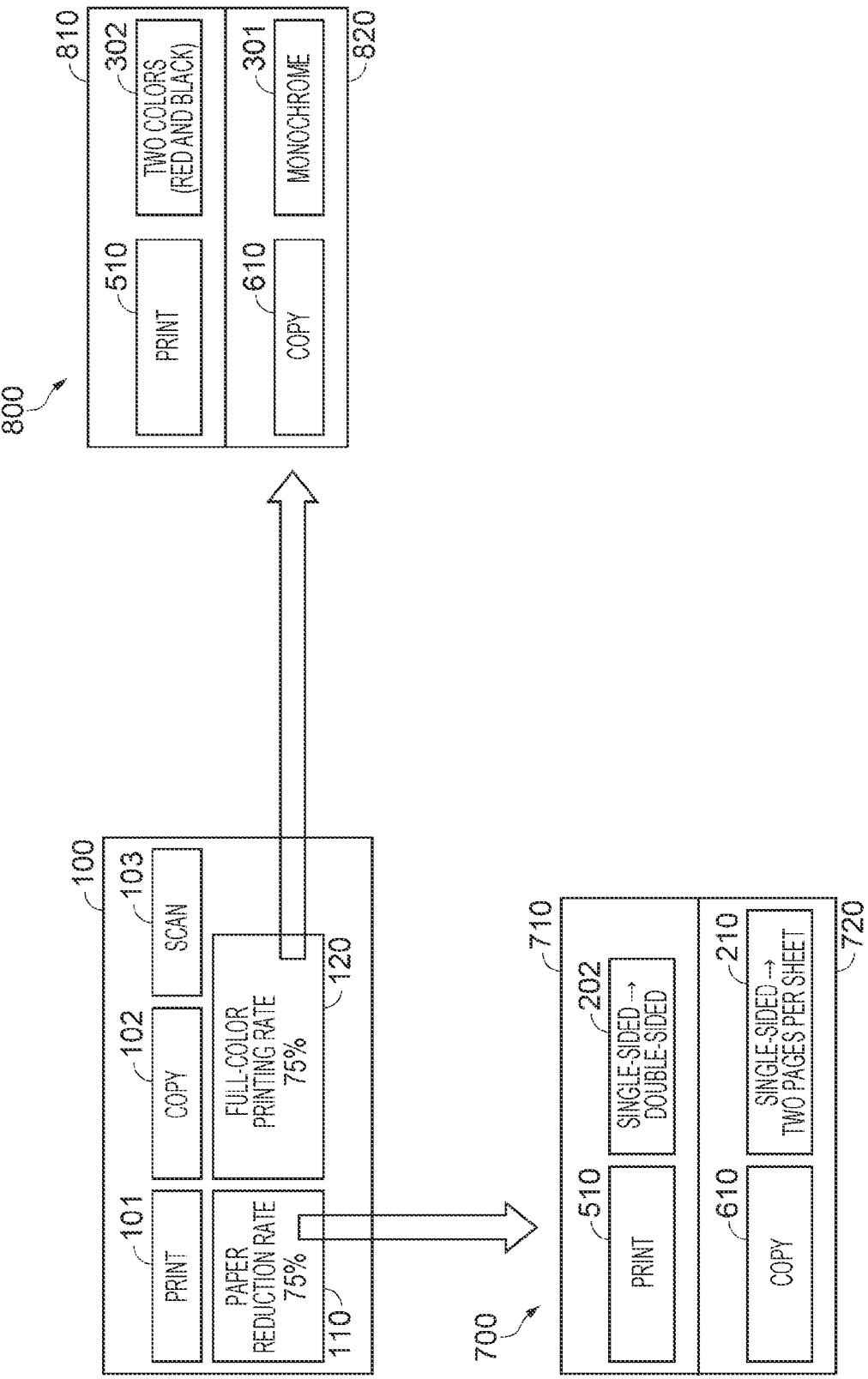
FIG. 9 is a transition diagram in which a setting is selected from a history screen or a registration screen.

When the input indicating that the "paper reduction rate" 110 is selected on the detection panel of the UI section 11 is detected, as shown in FIG. 9, the control section 10 transitions to a "history screen or registration screen of paper reduction setting" 700 relating to the "paper reduction rate" 110, which is the index, and displays the "history screen or registration screen of paper reduction setting" 700 by the display panel of the UI section 11. Specifically, the control section 10 displays a "history screen or registration screen 1 of paper reduction setting" 710 and a "history screen or registration screen 2 of paper reduction setting" 720, which indicate the history or the registration of the paper reduction setting item relating to the "paper reduction rate" 110, by the display panel of the UI section 11.

On the "history screen or registration screen 1 of paper reduction setting" 710, the control section 10 reads out the "print" 510 set or registered in the past and indicating the print function, and the "single-sided→double-sided" 202, which is the paper reduction setting item associated with the "print" 510 from the storage section 12, and displays the "print" 510 and the "single-sided→double-sided" 202 by the display panel of the UI section 11.

On the "history screen or registration screen 2 of paper reduction setting" 720, the control section 10 reads out the "copy" 610 set or registered in the past and indicating the copy function, and the "single-sided→two pages per sheet" 210, which is the paper reduction setting item associated with the "copy" 610 from the storage section 12, and displays the "copy" 610 and the "single-sided→two pages per sheet" 210 by the display panel of the UI section 11.

It should be noted that the control section 10 may display the history or the registration in the order of setting or registration on the "history screen or registration screen of paper reduction setting" 700 or vice versa, and may display the history or the registration by scrolling in a case in which there are many histories or registrations.

When the user selects the button of any of the "history screen or registration screen 1 of paper reduction setting" 710 or the "history screen or registration screen 2 of paper reduction setting" 720 and touches the button with a finger, the detection panel of the UI section 11 detects the input indicating that the paper reduction setting item of the touched button is set. The control section 10 can store the detected paper reduction setting item in the storage section 12 and can make the paper reduction setting, which can be used for controlling the print section 13.

On the other hand, when the input indicating that the "full-color printing rate" 120, which is the index, is selected on the detection panel of the UI section 11 is detected, as shown in FIG. 9, the control section 10 transitions to a "history screen or registration screen of print color setting" 800 relating to the "full-color printing rate" 120 and displays the "history screen or registration screen of print color setting" 800 by the display panel of the UI section 11. Specifically, the control section 10 displays a "history screen or registration screen 1 of print color setting" 810 and a "history screen or registration screen 2 of print color setting" 820, which indicate the history or the registration of the print color setting item relating to the "full-color printing rate" 120, by the display panel of the UI section 11.

On the "history screen or registration screen 1 of print color setting" 810, the control section 10 reads out the "print" 510 set or registered in the past and indicating the print function, and the "two colors (red and black)" 302, which is the print color setting item associated with the "print" 510 from the storage section 12, and displays the "print" 510 and the "two colors (red and black)" 302 by the display panel of the UI section 11.

On the "history screen or registration screen 2 of print color setting" 820, the control section 10 reads out the "copy" 610 set or registered in the past and indicating the copy function, and the "monochrome" 301, which is the print color setting item associated with the "copy" 610 from the storage section 12, and displays the "copy" 610 and the "monochrome" 301 by the display panel of the UI section 11.

It should be noted that the control section 10 may display the history or the registration in the order of setting or registration on the "history screen or registration screen of print color setting" 800 or vice versa, and may display the history or the registration by scrolling in a case in which there are many histories or registrations.

When the user selects the button of any of the "history screen or registration screen 1 of print color setting" 810 or the "history screen or registration screen 2 of print color setting" 820 and touches the button with a finger, the detection panel of the UI section 11 detects the input indicating that the print color setting item of the touched button is set. The control section 10 can store the detected print color setting item in the storage section 12 and can make the print color setting, which can be used for controlling the print section 13.

Next, a control in which the control section 10 transitions from the "basic setting screen" 100 to the "history screen or registration screen of paper reduction setting" 700 or the "history screen or registration screen of print color setting" 800 shown in FIG. 9 will be described with reference to FIG. 10. It should be noted that, in the following description of FIG. 10, the contents overlapping with the case of FIG. 3 will be omitted.

The control section 10 starts the control, and calculates, from the storage section 12, the index value of the paper reduction rate and the index value of the full-color printing rate for each print job or for each scan data within a predetermined period or within a predetermined range (S401).

Figure 10:
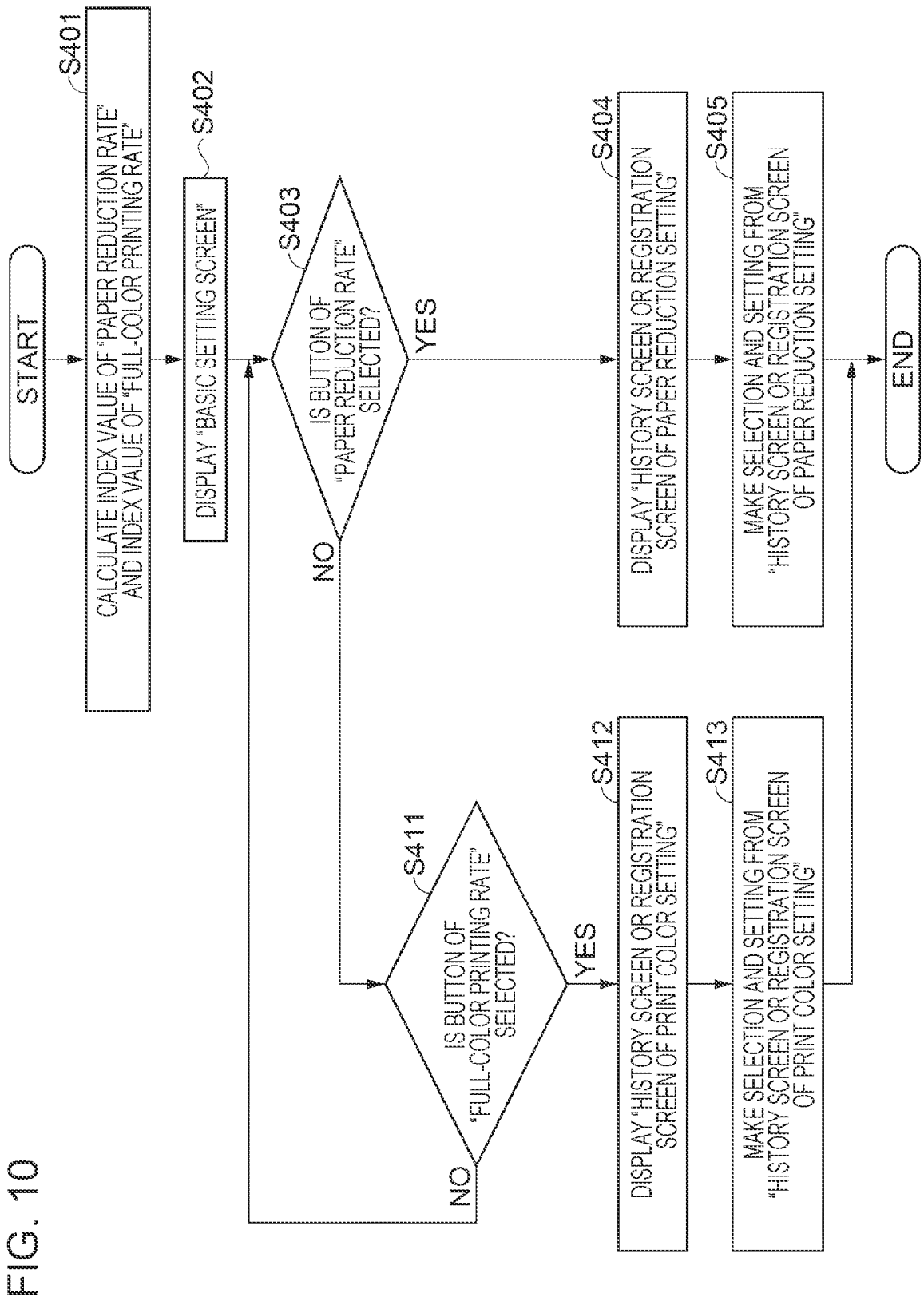
FIG. 10 is a flowchart showing a control of the transition of FIG. 9.

The control section 10 displays the "basic setting screen" 100 as shown in FIG. 10, including the calculated index value of the paper reduction rate, by the display panel of the UI section 11 (S402).

The control section 10 determines whether or not the button of the "paper reduction rate" 110 is selected by the input detection of the detection panel of the UI section (S403), and when it is determined that the button is selected (S403: YES), transitions to the "history screen or registration screen of paper reduction setting" 700 relating to the "paper reduction rate" 110, and displays the "history screen or registration screen of paper reduction setting" 700 by the display panel of the UI section 11 (S404).

Specifically, the control section 10 displays the "history screen or registration screen 1 of paper reduction setting" 710 and the "history screen or registration screen 2 of paper reduction setting" 720, which indicate the history or the registration of the paper reduction setting item relating to the "paper reduction rate" 110, by the display panel of the UI section 11.

When the user selects the button of any of the "history screen or registration screen 1 of paper reduction setting" 710 or the "history screen or registration screen 2 of paper reduction setting" 720 and touches the button with a finger, the detection panel of the UI section 11 detects the input indicating that the paper reduction setting item of the touched button is set. The control section 10 can store the detected paper reduction setting item in the storage section 12 and can make the paper reduction setting, which can be used for controlling the print section 13 (S405). The control section 10 terminates the control.

On the other hand, when it is determined that the button of the "paper reduction rate" 110 is not selected by the input detection of the detection panel of the UI section (S403: NO), the control section 10 determines whether or not the button of the "full-color printing rate" 120 is selected (S411), and when it is determined that the button is selected (S411: YES), the control section 10 transitions to the "history screen or registration screen of print color setting" 800 relating to the "full-color printing rate" 120, and displays the "history screen or registration screen of print color setting" 800 by the display panel of the UI section 11 (S412).

Specifically, the control section 10 displays the "history screen or registration screen 1 of print color setting" 810 and the "history screen or registration screen 2 of print color setting" 820, which indicate the history or the registration of the print color setting item relating to the "full-color printing rate" 120, by the display panel of the UI section 11.

It should be noted that, when it is determined that the button of the "full-color printing rate" 120 is not selected (S411: NO), the control section 10 returns to the determination as to whether the button of the "paper reduction rate" 110 is selected (S403).

When the user selects the button of any of the "history screen or registration screen 1 of print color setting" 810 or the "history screen or registration screen 2 of print color setting" 820 and touches the button with a finger, the detection panel of the UI section 11 detects the input indicating that the print color setting item of the touched button is set. The control section 10 can store the detected print color setting item in the storage section 12 and can make the print color setting, which can be used for controlling the print section 13 (S413). The control section 10 terminates the control.

As described above, with the image processing device 1 according to the present embodiment, it is possible to provide means for displaying the index of the consumption material, such as the paper or the ink, on the screen of the UI section 11 and making settings relating to printing in association with the displayed index.

As described above, the present embodiment has been described with reference to the drawings, a specific configuration is not limited to the embodiment, and may be changed, replaced, deleted, or the like without departing from the gist of the present disclosure.

In the image processing device 1, the print section 13 has been described with the ink jet head using the ink as an example, but other methods may be used. For example, the print section 13 may be an electrophotographic method using toner. In this case, the consumption material is the toner instead of the ink. In addition, as the index of the consumption material, an index relating to recycling, such as the use of recycled paper or synthetic paper may be included. Although the UI section 11 has been described with the touch panel display as an example, the display section may be a liquid crystal display or an organic EL, and may include a keyboard, a mouse, or the like separately provided as an input section.

In addition, a program for realizing the functions of any component section in the device described above may be recorded on a computer-readable recording medium, and the program may be executed by being read by a computer system. Here, examples of the device include the image processing device 1 and the external device 2. It should be noted that the "computer system" includes an operating system (OS) or hardware, such as peripheral devices. In addition, the "computer-readable recording medium" includes a portable medium, such as a flexible disk, a magneto-optical disk, a ROM, or a compact disk (CD)-ROM, and a storage device, such as a hard disk embedded in the computer system. Further, the "computer-readable recording medium" also includes a medium that holds the program for a certain period of time, such as a volatile memory inside the computer system, which serves as a server or a client in a case in which the program is transmitted via a network, such as the Internet, or a communication line, such as a telephone line.

In addition, the program may be transmitted from the computer system that stores the program in the storage device or the like to another computer system via a transmission medium or a transmission wave in the transmission medium. Here, the "transmission medium" that transmits the program refers to a medium having a function of transmitting information, such as the network, such as the Internet, or the communication line, such as the telephone line.

In addition, the program may be a program for realizing a part of the functions described above. Further, the program may be a program for realizing the functions described above in combination with a program previously recorded in the computer system, that is, a so-called differential file or differential program.

What is claimed is:

1. An image processing device comprising:
    a display;
    an input receiver;
    a printer that executes printing by using a consumption material;
    a controller configured to:
        calculate an index value of an index relating to the consumption material consumed by the printer to display the index and the index value by the display,
        display a setting item relating to the index by the display, when input indicating that the index is selected is detected by the input receiver, and
        control the printer to execute printing based on setting of the setting item, when input indicating that the setting item is set is detected by the input reviver;
    a communication circuit configured to communicate with an external device; and
    a scanner configured to read a document, wherein
    the controller
        is configured to select a first print formant in which the printer is configured to print first information acquired by the communication circuit, or a second print format in which the printer is configured to print second information acquired by the scanner, and
        selects the first print format of the second print format based on a predetermined condition to display the selected first print format of second print format together with the setting item relating to the index by the display, when the input indicating that the index is selected is detected by the input receiver.

2. The image processing device according to claim 1, wherein
    the consumption material is paper and the index relates to consumption of the paper, or the consumption material is ink and the index relates to consumption of the ink.

3. The image processing device according to claim 2, wherein
    the setting item includes an item relating to double-sided printing or multipage printing, when the index relates to the consumption of the paper, and
    the setting item includes an item relating to print color, when the index relates to the consumption of the ink.

4. The image processing device according to claim 1, further comprising:
    a storage medium that stores the setting item, wherein
    the controller reads out the setting item relating to the index from the storage medium to display the read out setting item by the display, when the input indicating that the index is selected is detected by the input receiver.

5. The image processing device according to claim 1, further comprising:
    an information reader configured to acquire identification information, wherein
    the controller
        is configured to acquire the identification information from the communication circuit, when the first information is acquired from the communication circuit,
        is configured to acquire the identification information from the information reader, when the second information is acquired from the scanner, and
        calculates the index value for each identification information to display the calculated index value by the display.

6. The image processing device according to claim 5, wherein
    the controller transmits predetermined information by the communication circuit or sets the setting item in association with the identification information, based on the index value calculated for each identification information.

7. The image processing device according to claim 1, wherein
    the controller calculates a prediction value for predicting the index value to display the prediction value by the display when the setting item is set.

8. A control method of an image processing device including a display, an input receiver, a printer that executes printing by using a consumption material, a communication circuit configured to communicate with an external device, and a scanner configured to read a document, the method comprising:
    calculating an index value of an index relating to the consumption material used by the printer to display the index and the index value by the display;
    displaying a setting item relating to the index by the display, when input indicating that the index is selected is detected by the input receiver;
    selecting a first print format in which the printer is configured to print first information acquired by the communication circuit, or a second print format in which the printer is configured to print second information acquired by the scanner, and
    selecting the first print format or the second print format based on a predetermined condition to display the selected first print format or second print format together with the setting item relating to the index by the display, when the input indicating that the index is selected is detected by the input receiver; and
    controlling the printer to execute printing based on setting of the setting item, when input indicating that the setting item is set is detected by the input receiver.

* * * * *